(12) United States Patent
Ichikawa et al.

(10) Patent No.: US 9,529,656 B2
(45) Date of Patent: Dec. 27, 2016

(54) COMPUTER RECOVERY METHOD, COMPUTER SYSTEM, AND STORAGE MEDIUM

(75) Inventors: Yujiro Ichikawa, Tokyo (JP);
Yoshifumi Takamoto, Tokyo (JP);
Takashi Tameshige, Tokyo (JP);
Masaaki Iwasaki, Tokyo (JP);
Masayasu Asano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 14/390,797

(22) PCT Filed: Jun. 22, 2012

(86) PCT No.: PCT/JP2012/065994
§ 371 (c)(1),
(2), (4) Date: Oct. 6, 2014

(87) PCT Pub. No.: WO2013/190694
PCT Pub. Date: Dec. 27, 2013

(65) Prior Publication Data
US 2015/0067401 A1    Mar. 5, 2015

(51) Int. Cl.
*G06F 11/00* (2006.01)
*G06F 11/07* (2006.01)

(52) U.S. Cl.
CPC ......... *G06F 11/079* (2013.01); *G06F 11/0748* (2013.01); *G06F 11/0757* (2013.01); *G06F 11/0766* (2013.01); *G06F 11/0793* (2013.01)

(58) Field of Classification Search
USPC ....................................... 714/6.21
See application file for complete search history.

(56) References Cited

U.S. PATENT DOCUMENTS

| 8,046,520 B2 | 10/2011 | Baba et al. |
| 2002/0120884 A1 | 8/2002 | Nakamikawa et al. |
| 2003/0070114 A1* | 4/2003 | Yasuda ............... G06F 11/0712 714/20 |

(Continued)

FOREIGN PATENT DOCUMENTS

| JP | 05-151027 A | 6/1993 |
| JP | 08-305600 A | 11/1996 |

(Continued)

*Primary Examiner* — Sarai Butler
(74) *Attorney, Agent, or Firm* — Mattingly & Malur, PC

(57) ABSTRACT

A computer recovery method for a computer system, the computer system having: a management computer having a processor and a memory; and a computer having a processor, a memory, and a monitoring part for notifying, when an abnormality occurs, the management computer of the abnormality, the management computer being configured to instruct recovery from the abnormality, the computer recovery method having: a first step of obtaining, by the management computer, hardware components and software components of the computer as configuration information; a second step of receiving, by the management computer, notification of an abnormality from the monitoring part of the computer; and a third step of generating, by the management computer, after the notification is received, component string information for identifying a component where the abnormality has occurred from the configuration information.

12 Claims, 19 Drawing Sheets

(56) References Cited

U.S. PATENT DOCUMENTS

2006/0265628 A1* 11/2006 Jauho ................. G06F 11/26
                                                                714/30
2010/0083043 A1    4/2010  Niioka

FOREIGN PATENT DOCUMENTS

| JP | 10-326208 A | 12/1998 |
| JP | 2002-259155 A | 9/2002 |
| JP | 2005-258501 A | 9/2005 |
| JP | 2005-316728 A | 11/2005 |
| JP | 2010-086364 A | 4/2010 |
| JP | 2010-146175 A | 7/2010 |
| JP | 2011-113122 A | 6/2011 |

* cited by examiner

| ID | OPERATION NAME |
|---|---|
| 1 | WDD RESTART |
| 2 | OS REBOOT |
| 3 | LPAR REACTIVATION |
| 4 | H/W RESTART |

233 RECOVERY OPERATION INFORMATION

*Fig. 9*

| TYPE ID | OPERATION NAME | INTERVAL |
|---|---|---|
| BMC (GENERAL PURPOSE) | TIMER RESET SIGNAL TRANSMISSION | 60 (sec) |
| BMC (PREVENTABLE) | COUNTERMEASURE WITHHOLDING SIGNAL TRANSMISSION | 0 (sec) |

224 STANDBY OPERATION INFORMATION

*Fig. 10*

| ID (700) | CHILD ID (701) | NAME (702) | TYPE VALUE (703) |
|---|---|---|---|
| 1 | - | OS-LS-A0 | OS |
| 2 | 1 | LS-A0 | MANAGEMENT LPAR |
| 3 | 2 | HOST-A | Host |
| 4 | 3 | SERVER-A | BMC (GENERAL PURPOSE) |
| 5 | - | OS-LS-A1 | OS |
| 6 | 5 | LS-A1 | BUSINESS OPERATION LPAR |

220 CONFIGURATION INFORMATION

*Fig. 16*

| TYPE ID (1700) | OFFSET (1701) | START POINT PERMISSION (1702) |
|---|---|---|
| Host | 0 | N |
| Logical Server | 0 | Y |
| OS | 1 | Y |

221 COMPONENT CHARACTERISTICS INFORMATION

*Fig. 17*

| ID | 1 | 2 | 3 | 4 | 5 |
|---|---|---|---|---|---|
| TYPE VALUE | WDD | OS | MANAGEMENT LPAR | Host | BMC |
| COMPONENT | 0 | 0 | 0 | 0 | 0 |

810 COMPONENT STRING

*Fig. 20*

| ID | 1 | 2 | 3 | 4 | 5 |
|---|---|---|---|---|---|
| TYPE VALUE | WDD | OS | MANAGEMENT LPAR | Host | BMC |
| COMPONENT | 1 | 0 | 0 | 0 | 0 |

810 COMPONENT STRING

*Fig. 21*

COMPUTER RECOVERY METHOD, COMPUTER SYSTEM, AND STORAGE MEDIUM

BACKGROUND

This invention relates to a computer system, and more particularly, to a technology of detecting an abnormality in a computer with the use of a timer.

Server integration is expected to increase in scale with the improvement in the processing performance of servers by way of multi-core CPUs. It is also expected that the need for server integration methods (hereinafter referred to as server integration modules) of the partitioning type, which allows for a choice between sharing physical resources among logical servers (hereinafter LPARs) and allocating physical resources to respective LPARs in an exclusive manner, will grow as the providing of real-time services such as SaaS-type customer relationship management (CRM)/social networking service (SNS) (SaaS stands for Software as a Service) becomes popular.

The reliability demanded per server apparatus in the server integration environment described above is higher than in cases where a necessary level of computing ability is secured by putting in a large number of bare servers which are relatively inexpensive. One of methods that have hitherto been used to improve the reliability of a server apparatus is alive monitoring that uses a self-monitoring apparatus such as a watchdog timer (WDT) (hereinafter referred to as WDT timeout monitoring) (see, for example, JP 05-151027 A).

SUMMARY

In WDT timeout monitoring, an example of which is JP 05-151027 A, a computer where a timeout has occurred performs self-recovery by restarting its hardware (H/W). The recovery, however, could stop the processing of programs running normally on the computer, such as an OS and applications (APs).

Examples of the cause of a timeout include:

(1) a WDT counter resetting daemon (hereinafter WD daemon) which operates on a host LPAR for server integration environment management;

(2) shutting down of an OS on the LPAR;

(3) shutting down of the LPAR; and (4) shutting down of a server integration module.

With Causes (1) to (3), the WDT executes H/W restart despite other LPARs, which are allocated other physical resources exclusively, being unaffected, i.e., despite other LPARs running normally.

The processing of programs on a computer where a timeout has occurred in accordance with a WDT is brought to a safe stop by known methods which include JP 2010-86364 A. In JP 2010-86364 A, screen information is monitored for the end of memory dump processing of the OS until a newly added timeout threshold is reached, thereby avoiding executing H/W restart during memory dump. However, the method of JP 2010-86364 A which is to place a moratorium on H/W restart involves ultimately executing the recovery of the entire apparatus through H/W reset, and therefore cannot solve the problem of JP 05-151027 A.

The problem of JP 05-151027 A arises from the fact that the WDT does not have an ability to resolve the cause of a timeout.

An object of this invention is to sort components of a computer system in which an abnormality (or failure) has occurred and perform appropriate recovery processing only on the area of the abnormality.

A representative aspect of this invention is as follows. A computer recovery method for a computer system, the computer system having: a management computer comprising a processor and a memory; and a computer having a processor, a memory, and a monitoring part for notifying, when an abnormality occurs, the management computer of the abnormality, the management computer being configured to instruct recovery from the abnormality, the computer recovery method comprising: a first step of obtaining, by the management computer, hardware components and software components of the computer as configuration information; a second step of receiving, by the management computer, notification of an abnormality from the monitoring part of the computer; and a third step of generating, by the management computer, after the notification is received, component string information for identifying a component where the abnormality has occurred from the configuration information.

According to this invention, components of a computer in which an abnormality has occurred are identified and appropriate recovery processing can be performed only on the area of a component that is experiencing the abnormality. In addition, a monitoring part of the computer can withhold hardware reset until the recovery processing is completed.

BRIEF DESCRIPTION OF THE DRAWINGS

FIG. 9 shows an example of the recovery operation information according to the first embodiment of this invention.

FIG. 10 shows an example of the standby operation information according to the first embodiment of this invention.

FIG. 16 shows an example of information that is included in the configuration information FIG. 17 shows an example of the component characteristics information according to the second embodiment of this invention.

FIG. 20 shows an example in which a bit string is employed as a component string.

FIG. 21 shows an example in which a bit string is employed as a component string.

DETAILED DESCRIPTION OF THE PREFERRED EMBODIMENTS

Embodiments of this invention are described below with reference to the accompanying drawings.

First Embodiment

Figure 1A:
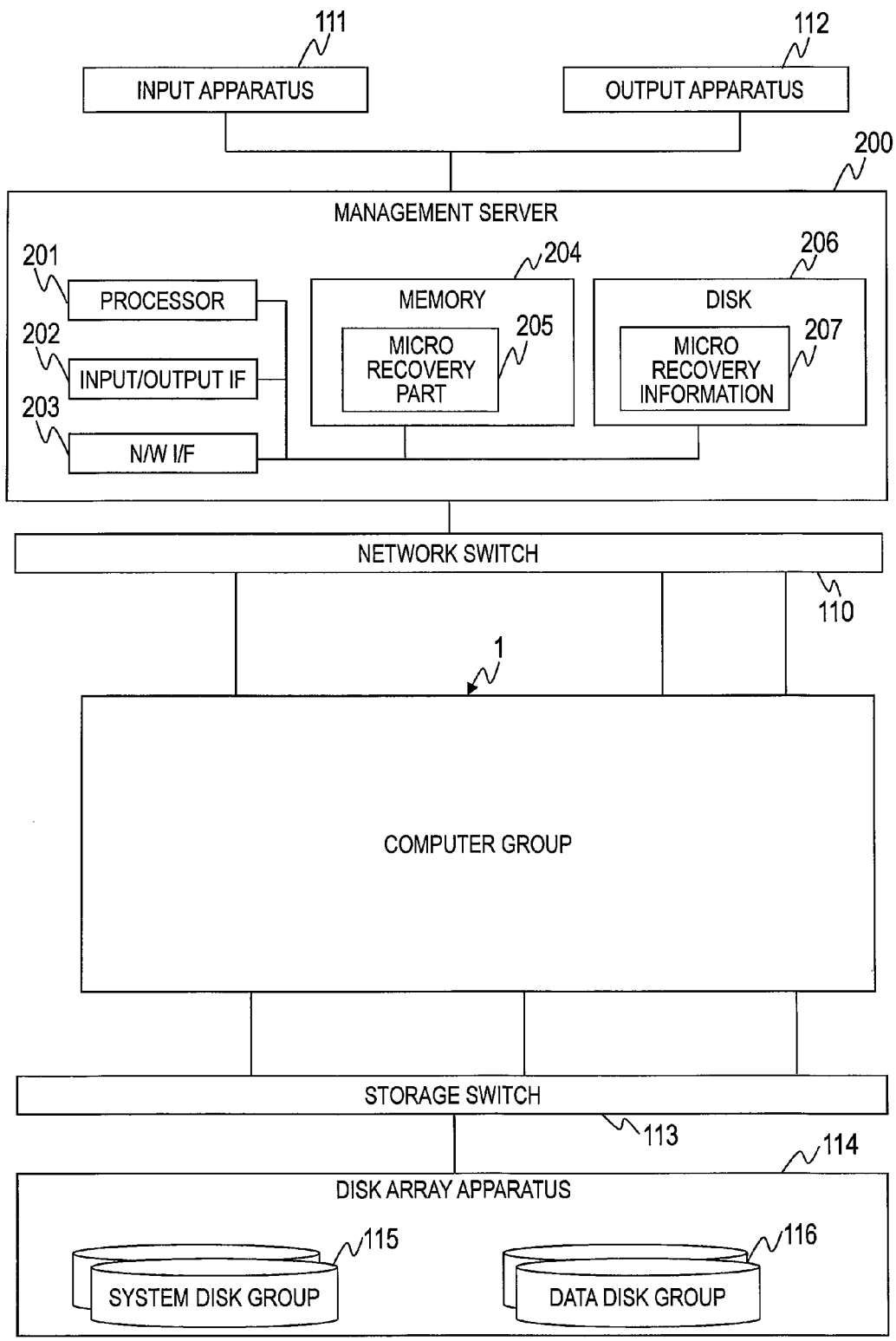
FIG. 1A is a block diagram of a first half illustrating an example of a computer system according to a first embodiment of this invention.
Figure 1B:
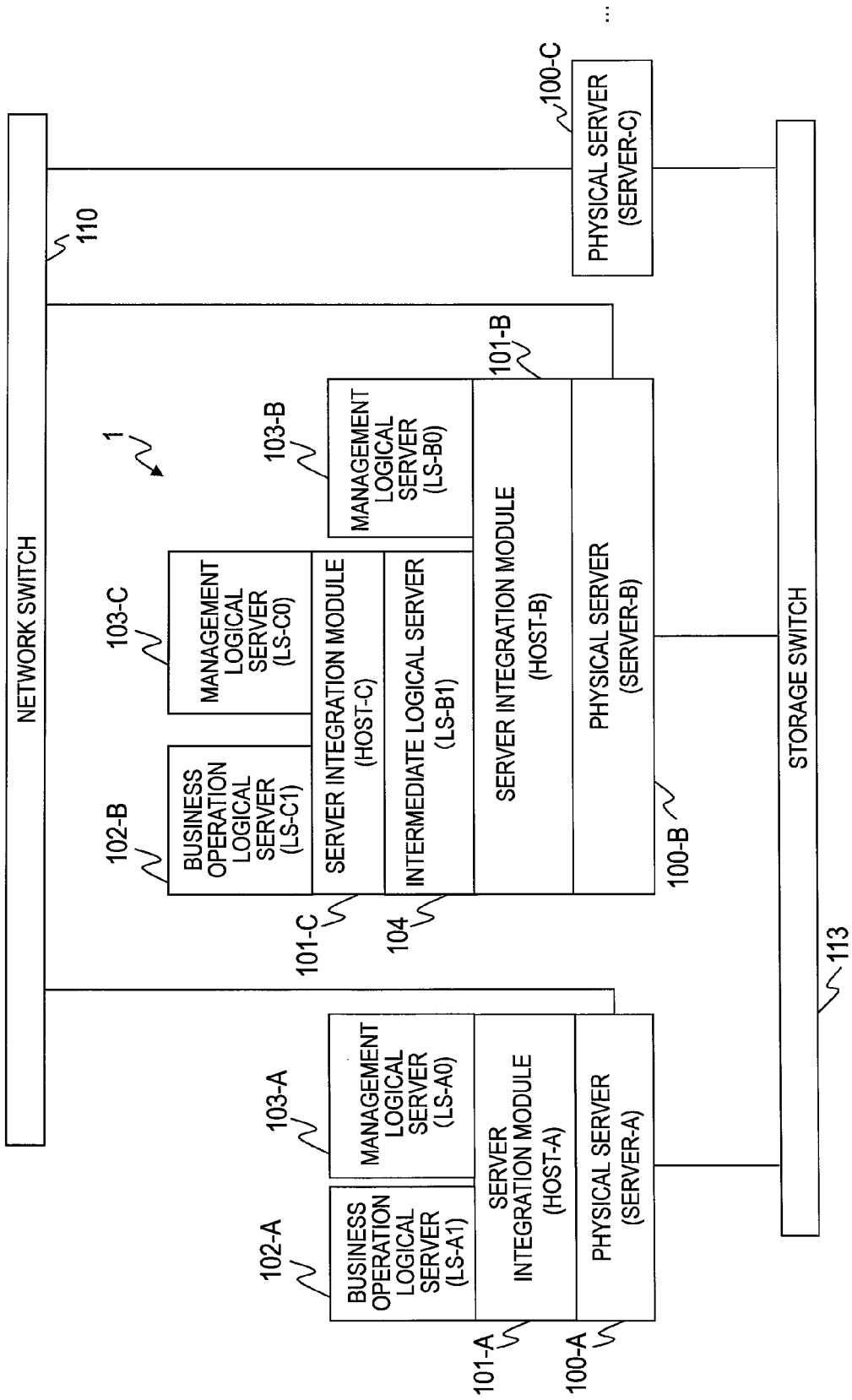
FIG. 1B is a block diagram of a second half illustrating an example of a computer system according to the first embodiment of this invention.

FIGS. 1A and 1B are block diagrams illustrating an example of a computer system according to a first embodiment of this invention.

The computer system of FIGS. 1A and 1B includes a management server 200, a computer group 1 which includes at least one physical server, here, physical servers 100-A to 100-C, at least one network switch 110, at least one storage switch 113, a disk array apparatus 114, an input apparatus 111, and an output apparatus 112.

The management server 200 is a computer that operates under control of programs, and includes a network interface (NW/IF) 203, which couples to a network switch 110. The management server 200 couples to the physical servers 100-A to 100-C and the disk array apparatus 114 via the network switch 110. The management server 200 includes therein a processor 201, an input/output IF 202, the NW/IF 203, a memory 204, and a disk 206. The physical servers 100-A to 100-C are collectively referred to as physical servers 100.

A micro recovery part 205 is loaded onto the memory 204 and executed by the processor 201. The disk 206 holds micro recovery information 207 thereon. The management server 200 uses the micro recovery information 207 to run the micro recovery part 205. Details of the micro recovery part 205 and the micro recovery information 207 are described with reference to FIG. 2 and subsequent drawings.

The processor 201 operates as programmed by respective programs of function parts, thereby operating as the function parts which implement given functions. For instance, the processor 201 functions as the micro recovery part 205 by operating as programmed by a micro recovery program. The same is true for other programs as well. The processor 201 also functions as function parts that respectively implement a plurality of processing procedures executed by the programs. The computers and the computer system are apparatus and a system that include these function parts.

Programs, tables, and other types of information for implementing the functions of the micro recovery part 205 can be stored on the disk 206, the disk array apparatus 114, or other storage devices such as a non-volatile semiconductor memory and a solid state drive (SSD), or on a computer-readable non-transitory data storage medium such as an IC card, an SD card, or a DVD.

Figure 3:
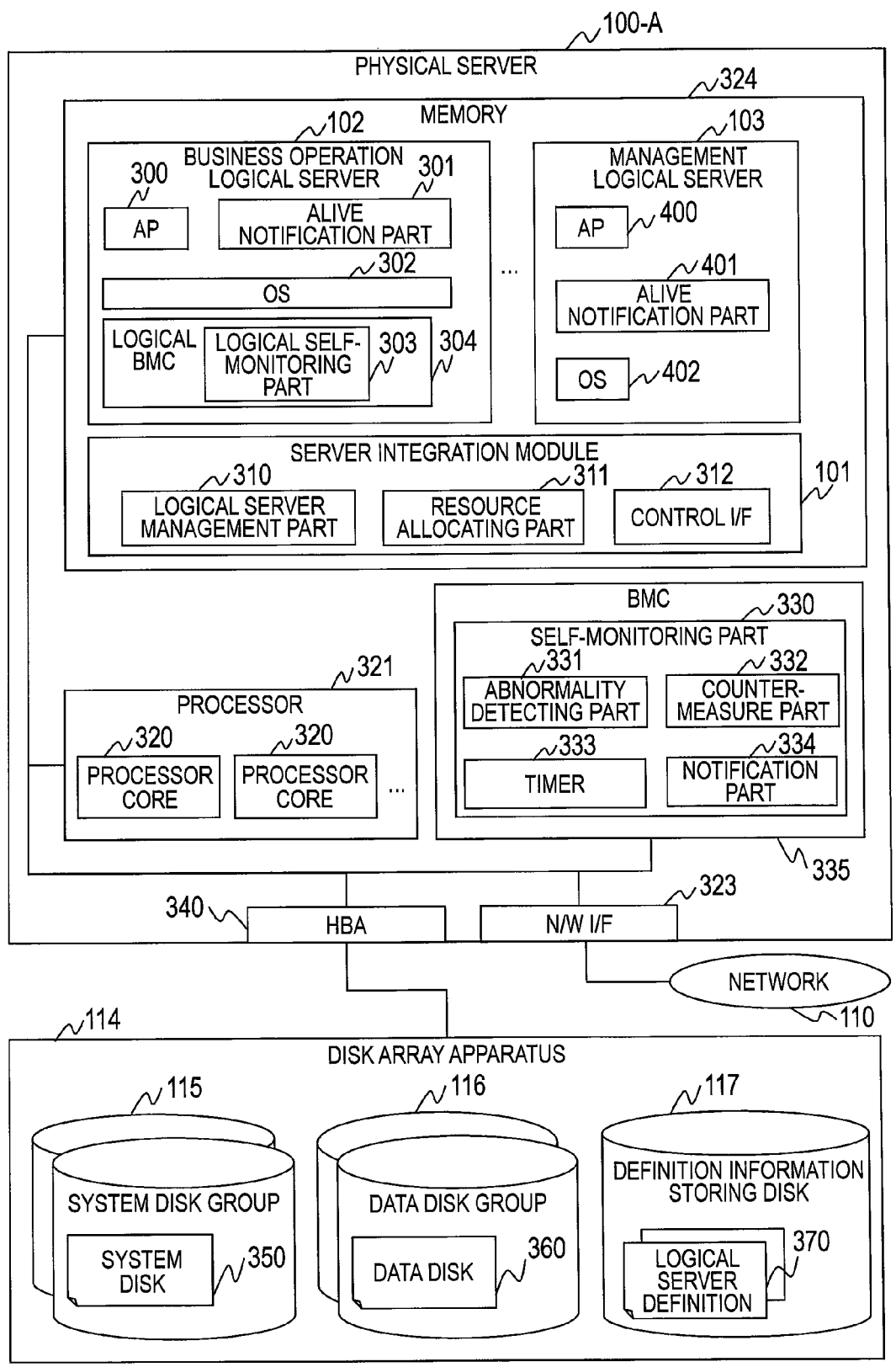
FIG. 3 is a block diagram illustrating the configuration of the physical server according to the first embodiment of this invention.
Figure 4:
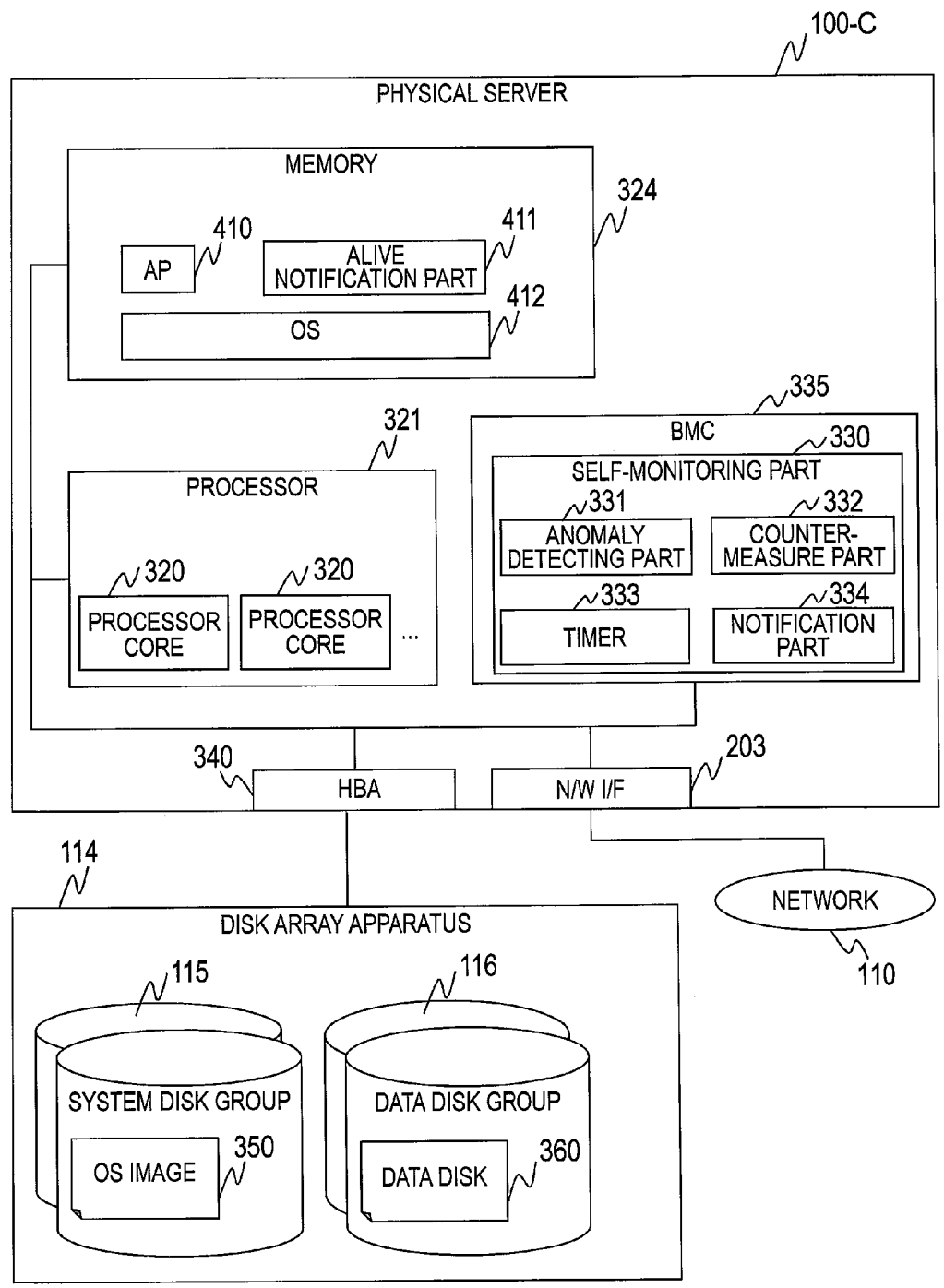
FIG. 4 is a block diagram illustrating the configuration of the physical server according to the first embodiment of this invention.

Each physical server 100 is a computer that operates under control of programs, and, as illustrated in FIG. 3 and FIG. 4, includes an NW/IF, which couples to the network switch 110, and a host bus adapter (HBA) 340, which couples to the storage switch 113. The physical server 100 couples to other physical servers 100, the management server 200, and the disk array apparatus 114 via the network switch 110. The physical server 100 couples to the disk array apparatus 114 via the storage switch 113. A server integration module 101 runs on the physical server 100, and a business operation logical server 102 and a management logical server 103 may run on the server integration module 101. An intermediate logical server 104 may also run on the server integration module 101, and another server integration module 101, here, 101-C, may further run on the server integration module 101. The business operation logical server 102 and the management logical server 103 may instead be a business operation virtual machine and a management virtual machine, respectively.

The network switch 110 includes at least one piece of network equipment. Concrete examples of network equipment include network switches, routers, load balancers, and firewalls. In other words, the network switch 110 constitutes a network. The network switch 110 is referred to as network 110 in the following description.

The disk array apparatus 114 includes a fiber channel (FC) (or a LAN interface) which is used by the management server 200 and the physical servers 100. The disk array apparatus 114 is a storage apparatus system that includes at least one disk. The disk array apparatus 114 has a system disk group 115 and a data disk group 116 as a system disk and a data disk that are necessary for the physical servers 100, the server integration module 101, the business operation logical server 102, and the management logical server 103 to operate individually.

The input apparatus 111 is coupled to the management server 200 via the input/output I/F 202 in order for an administrator or others to operate for an input. The input apparatus is specifically a keyboard, a mouse, a touch panel, or a client computer apparatus to which a keyboard, a mouse, or a touch panel is connected.

The output apparatus 112 is used to output the administrator's input made by operating the input apparatus 111, and a response from a component to the input operation. The output apparatus 112 is specifically a display or a client computer to which a display is connected. The output apparatus 112 is connected to the management server 200 via the input/output I/F 202.

FIG. 1B illustrates, as an example of the operation mode of the physical servers 100, the physical server 100-A, which executes a server integration module 101-A for providing a plurality of virtual servers, the physical server 100-B, which executes the server integration module 101-C on a server integration module 101B to provide a plurality of virtual servers, and the physical server 100-C, which runs alone.

The server integration modules 101-A to 101-C are collectively referred to as server integration modules 101. Hypervisors or virtual machine monitors (VMMs) can be employed as the server integration modules 101.

In the physical server 100-A, a business operation logical server 102-A, which provides a business operation, and a management logical server 103-A, which provides a management I/F of the server integration module 101-A, are run on the server integration module 101-A.

In the physical server 100-B, the intermediate logical server 104 and a management logical server 103-B, which provides a management I/F of the server integration module 101-B, are run on the server integration module 101-B. The server integration module 101-C is run on the intermediate logical server 104. A business operation logical server 102-B, which provides a business operation, and a management logical server 103-C, which provides a management I/F of the server integration module 101-C, are run on the server integration module 101-C.

Figure 2:
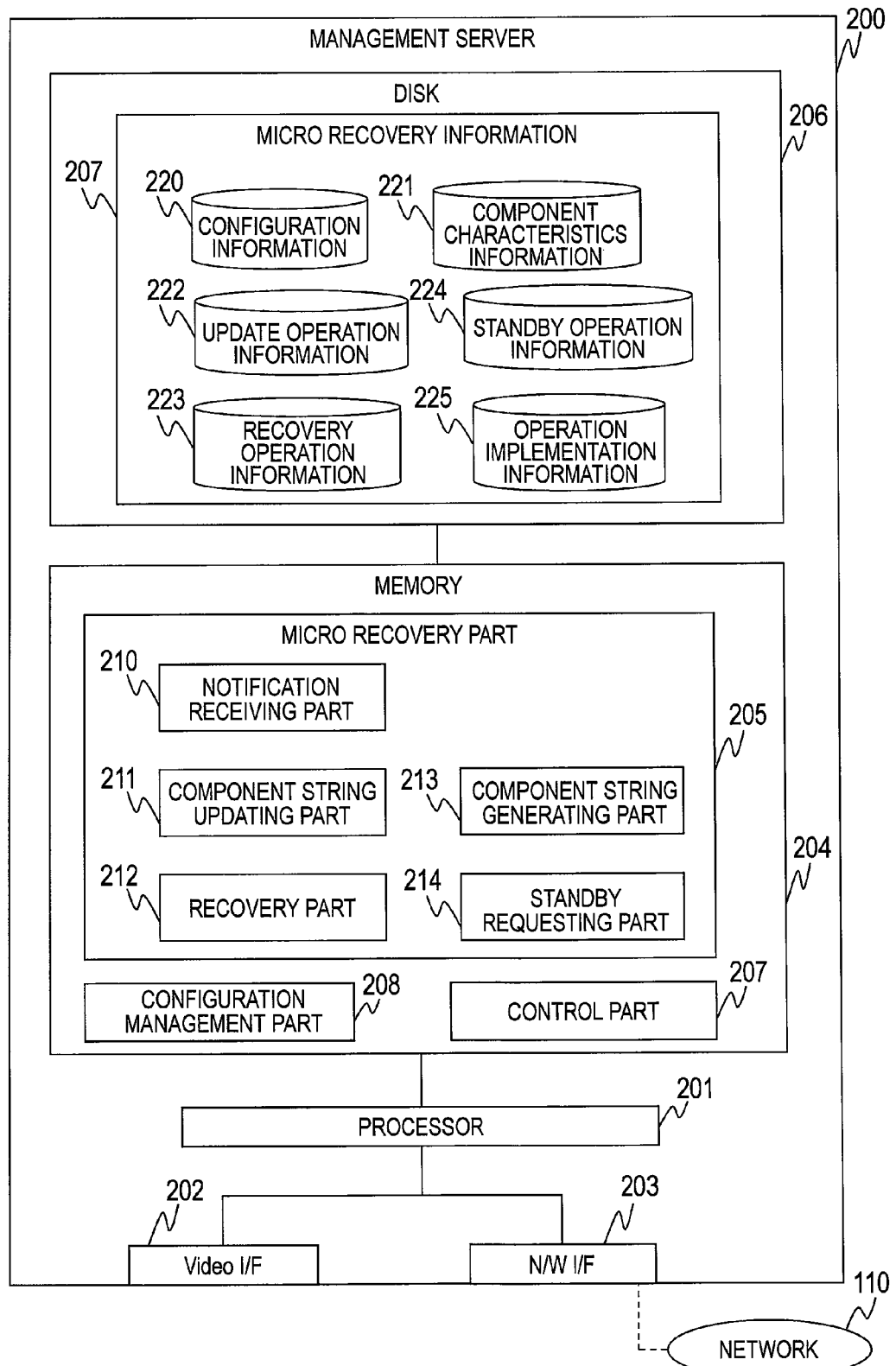
FIG. 2 is a block diagram illustrating the configuration of the management server according to the first embodiment of this invention.

FIG. 2 is a block diagram illustrating the configuration of the management server 200. The management server 200 includes the micro recovery part 205, a configuration management part 208, a control part 207, and the micro recovery information 207.

The micro recovery part 205 includes a notification receiving part 210, a component string updating part 211, a recovery part 212, a component string generating part 213, and a standby requesting part 214.

The micro recovery information 207 includes, as information for executing the micro recovery part 205, configuration information 220, component characteristics information 221, update operation information 222, recovery operation information 223, standby operation information 224, and operation implementation information 225. The micro recovery part 205, the configuration management part 208, and the control part 207, which are described in this embodiment as programs executed by the processor (CPU) 201, may be implemented as hardware or firmware installed in the management server 200, or a combination thereof. The micro recovery part 205, the configuration management part 208, and the control part 207 are stored in an auxiliary storage included in the management server 200, and executed by the processor 201 after loaded onto the memory 204.

The configuration management part 208 collects and holds information of the configuration information 220 from respective application program interfaces (APIs) and common language infrastructures (CLIs) of the physical servers 100, the server integration modules 101, the business operation logical servers 102, and the management logical servers 103.

In the control part 207, the recovery operation information 223 and the standby operation information 224 transmit a command and receive a response via the operation implementation information 225. In order for the configuration management part 203 to collect information, the control part 207 also transmits a command to, and receives a response from, the physical servers 100, the server integration modules 101, the business operation logical servers 102, the management logical servers 103, software (OSes, services, and the like) running on the servers and modules, the disk array apparatus 114, and others.

The management server 200 has the N/W I/F 203 for coupling to the network 204. The management server 200 couples to the physical servers 100, the server integration modules 101, the business operation logical servers 102, the management logical servers 103, and the disk array apparatus 114 via the network 204. The management server 200 may include a plurality of N/W I/Fs.

FIG. 3 is a block diagram illustrating the configuration of the physical server 100-A of FIG. 1B. The physical server 100 includes a memory 324, a processor 321, and a baseboard management controller (BMC) 335 for monitoring the physical server 100. The memory 324 holds programs for running the server integration module 101, the business operation logical server 102, and the management logical server 103. A plurality of business operation logical servers 102 may be run on the physical server 100. The processor 321 has at least one processor core 320 for executing commands.

The physical server 100 has an N/W I/F 323 for coupling to the network 110. The physical server 100 couples to the management server 200 and other physical servers 100 via the network 110. The physical server 100 has the HBA 340 for coupling to the disk array apparatus 114. The physical server 100 may have a plurality of NICs and HBAs.

The BMC (physical BMC) 335 monitors the physical server 100 for power control or the like. The BMC 335 therefore has a self-monitoring part 330, which includes a WDT. The self-monitoring part 330 is for monitoring the running state of the physical server 100. The self-monitoring part 330 is installed in the BMC 335 of the physical server 100 in the form of, for example, a watchdog timer (WDT). The self-monitoring part 330 of the BMC 335 includes an abnormality detecting part 331, a countermeasure part (recovery processing part) 332, a timer 333, and a notification part 334.

The timer 333 is used by the abnormality detecting unit 331 to detect an abnormality in the physical server 100. An example of the operation of the timer 333 is counting processing based on an H/W clock or the like. When a timer count reset request signal is transmitted to the self-monitoring part 330, the count on the timer 333 is reset. A timer count reset request signal is transmitted at given time intervals from, for example, an alive notification part 401 of the management logical server 103. Exceeding a threshold that is set in advance to the timer 333 is regarded as a timeout and the abnormality detecting part 331 notifies the timeout at that point. For example, when the management logical server 103 shuts down, the alive notification part 401 no longer transmits a time count reset request signal and the value of the timer 333 increases. The abnormality detecting part 331 of the self-monitoring part 330 detects a timeout when the value of the timer 333 exceeds a given threshold. The alive notification part 401 is referred to as watchdog daemon (WDD) in FIG. 7 and other drawings which are described later.

The timer 333 may have two thresholds so that a timeout warning indicating the possibility of a timeout is issued when a first threshold is exceeded, while a timeout is detected when a second threshold larger than the first threshold is exceeded. The timer 333 in the first embodiment has one threshold (the second threshold).

The abnormality detecting part 331 is for detecting an abnormality in the physical server 100. In a concrete example of the abnormality detecting part 331, the countermeasure part 332 and the notification part 334 are activated with a timeout notification from the timer 333 as a trigger. In another example of the timer 333 and the abnormality detecting part 331, the timer 333 only performs counting processing and the abnormality detecting part 331 monitors the count on the timer 333 so that, when a threshold set in advance to the abnormality detecting part 331 is exceeded, the abnormality detecting part 331 determines that a timeout has occurred.

The countermeasure part 332 executes an action determined in advance (for example, H/W reset by interruption to the processor 201) in response to an abnormality in the physical server 100.

The notification part 334 is for notifying an event that is related to the physical server 100 (e.g., a timeout on the WDT) to the management server 200 outside the physical server 100.

The server integration module 101 is a program for running the business operation logical server 102 and the management logical server 103. The server integration module 101 includes a logical server management part 310, a resource allocating part 311, and a control I/F 312.

The logical server management part 310 collects and holds load information (the processor utilization ratio, memory utilization ratio, or the like), configuration information (the OS type, allocated virtual devices, or the like), and state information (active/deactive, enabled/disabled state of a device, the presence/absence of a device failure, or the like) of the business operation logical server 102 and the management logical server 103, and also updates these pieces of information.

The resource allocating part 311 allocates physical resources (the at least one processor core 320, the memory, and the like) to the business operation logical server 102 and the management logical server 103, and allocates virtual devices. The resource allocating part 311 can choose between exclusive allocation and sharing as the mode of physical resource allocation to the business operation logical server 102 and the management logical server 103.

The control I/F 312 provides an interface for access to the logical server management part 310 and the resource allocating part 311 to components outside of the server integration module 101 (for example, an AP 400 on the management logical server 103).

The business operation logical server 102 and the management logical server 103 are run on the server integration module 101. The business operation logical server 102 and the management logical server 103 are logical server apparatus to which resources of the physical server 100 are allocated by the server integration module 101.

An OS 302, an application program (AP) 300, which has processing necessary for a business operation (a software program or the like), and an alive notification part 301 for holding communication to and from a logical self-monitoring part 303, are run on the business operation logical server 102. Processing of the alive notification part 301 is the same as the processing of the alive notification part 401 on the management logical server 103. The OS 302 includes management information of the OS 302, state information of the AP 300, and a management I/F that provides control of the AP 300.

The business operation logical server 102 includes a logical baseboard management controller (BMC) 304 for managing the logical server apparatus. The logical BMC 304 has the logical self-monitoring part 303 as a logical part for self-monitoring. The logical self-monitoring part 303 receives a timer reset signal at given intervals from the alive notification part 301, similarly to the self-monitoring part 330 of the BMC 335. The logical self-monitoring part 303 can detect the shutting down of the business operation logical server 102 or the server integration module 101 with the use of a WDT.

The management logical server 103 provides a management I/F of the server integration module 101 to components outside the physical server 100. The management logical server 103 includes an OS 402, the AP 400, which has processing necessary to provide the management I/F (a software program or the like), and the alive notification part 401 for transmitting a timer count reset request signal to the timer 333 via the self-monitoring part 330.

The disk array apparatus 114 has the system disk group 115, the data disk group 116, and a definition information storing disk 117. The system disk group 115 includes system disks (or boot images) 350 on which OSes and other types of system software respectively installed in the business operation logical server 102, the management logical server 103, and the server integration module 101 are stored. System software related to the server integration module 101 which is stored in the disk array apparatus 114 in this embodiment may be stored inside the physical server 100 in the form of, for example, firmware.

The data disk group 116 includes data disks 360 which are used in processing executed by the business operation logical server 102, processing executed by the management logical server 103, and processing executed by the server integration module 101. A data disk related to the server integration module 101 which is stored in the disk array apparatus 114 in this embodiment may be stored in a memory or a disk inside the physical server 100.

The definition information storing disk 117 stores logical server definitions 370, which includes metadata about the business operation logical server 102 and the management logical server 103. Written in the metadata are installed OSes, allocated virtual devices, resource allocation states, running states, and the like. The definition information storing disk 117 which is stored in the disk array apparatus 114 in this embodiment may be stored in a memory or a disk inside the physical server 100.

The physical server 100-B of FIG. 1B has a hardware configuration similar to that of the physical server 100-A. In the physical server 100-B, however, the intermediate logical server 104 and the management logical server 103-B are run on the server integration module 101-B, and the server integration module 101-C is further run on the intermediate logical server 104. The part similar to the configuration of the physical server 100-A is that the business operation logical server 102-B and the management logical server 103-C are run on the server integration module 101-C.

FIG. 4 is a block diagram illustrating the configuration of the physical server 100-C. The physical server 100-C has the same pieces of hardware as those of the physical server 100-A of FIG. 3 which are the memory 324, the processor 321, and the BMC 355 including the self-monitoring part 330. The processor 321 has at least one processor core 320 for executing commands. The memory 324 holds an AP 410, which has processing necessary for a business operation (a software program or the like), an alive notification part 411, and an OS 412. The alive notification part 411 transmits a timer count reset request signal to the timer 333 via the self-monitoring part 330 of the BMC 335, and monitors the physical server 100-C with the use of a WDT.

The physical server 100-C has the N/W I/F 203 for coupling to the network 110. The physical server 100-C couples to the management server 200 and the other physical servers, 100-A and 100-B, via the network 110. The physical server 100-C has the HBA 340 for coupling to the disk array apparatus 114. The physical server 100-C may have a plurality of NICs and HBAs.

Figure 5A:
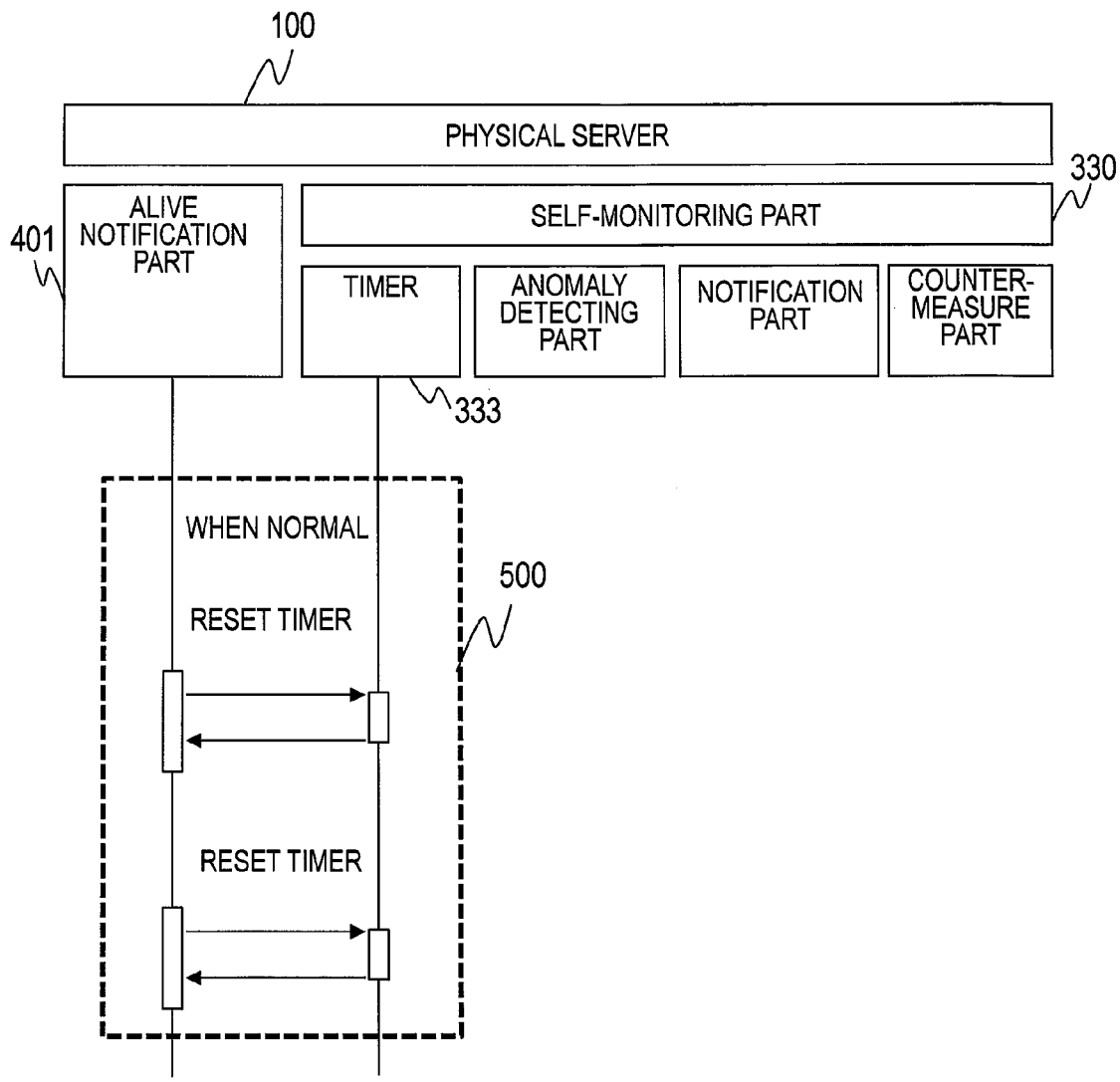
FIG. 5A is a sequence diagram illustrating examples of processing that is executed between one of the physical server according to the first embodiment of this invention.
Figure 5B:
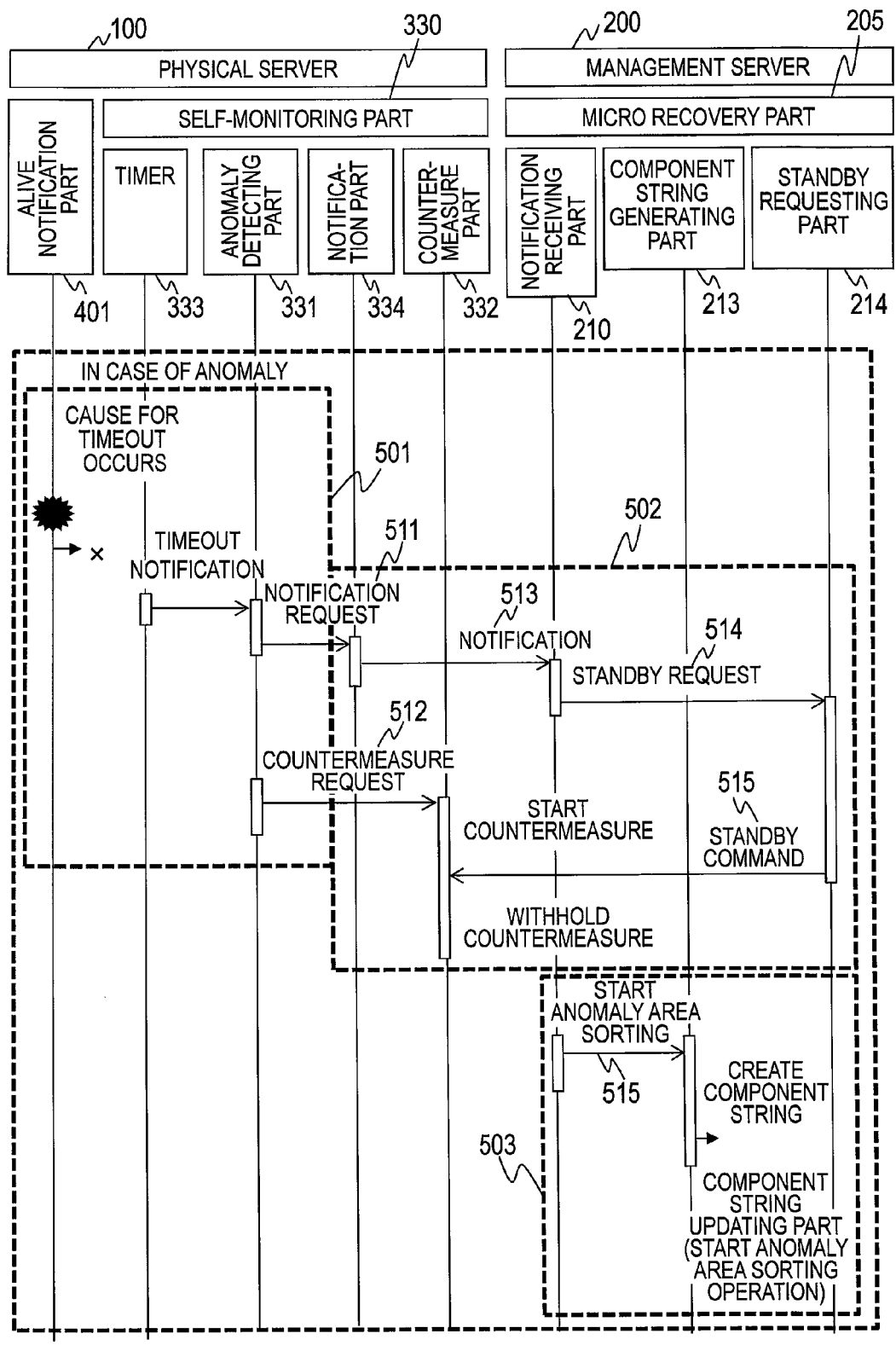
FIG. 5B is a sequence diagram illustrating examples of processing that is executed between one of the physical server and the management server according to the first embodiment of this invention.
Figure 6:
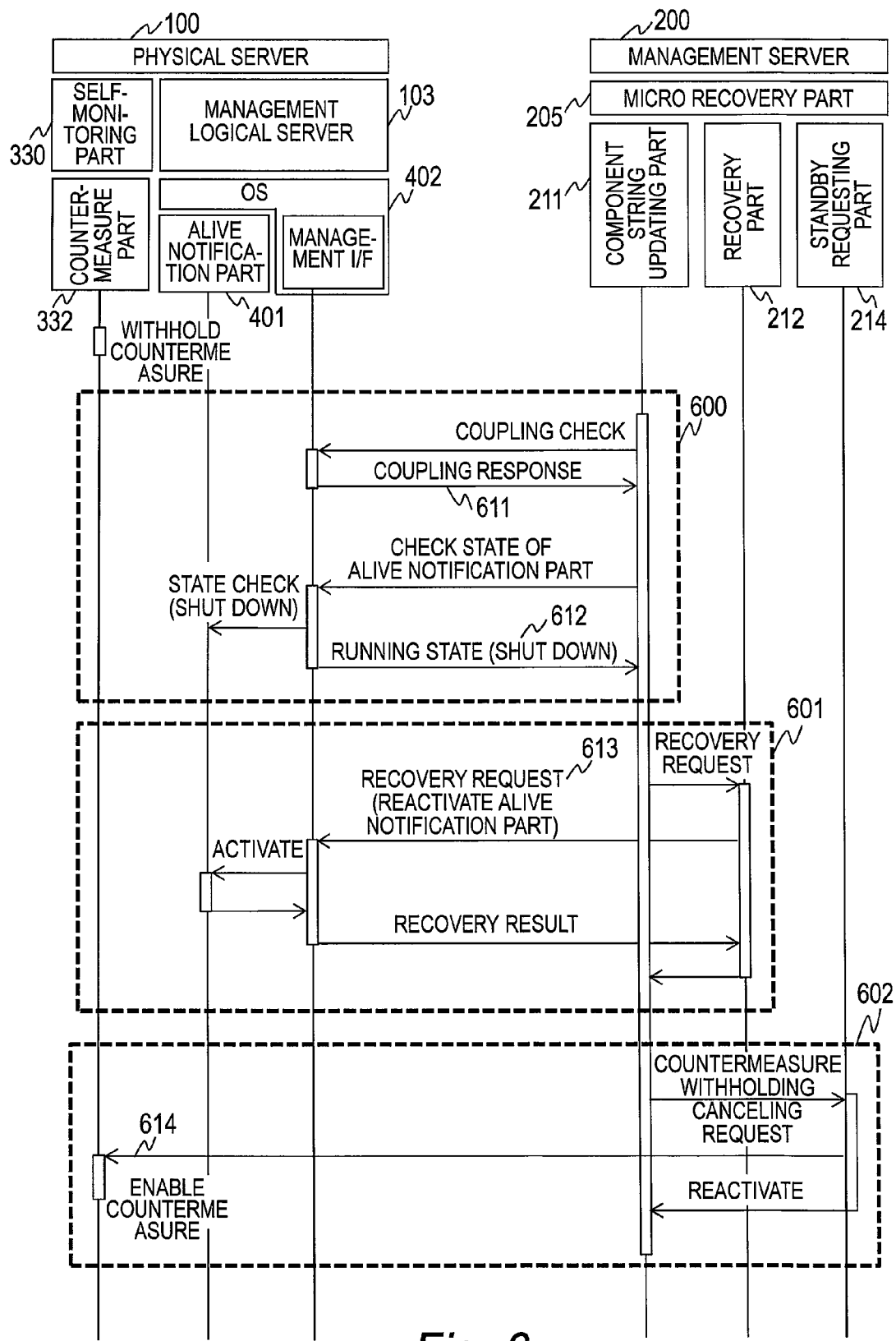
FIG. 6 is a sequence diagram illustrating examples of processing that is executed between one of the physical server and the management server according to the first embodiment of this invention.

FIGS. 5A and 5B and FIG. 6 are sequence diagrams illustrating examples of processing that is executed between one of the physical servers 100 and the management server 200 in this embodiment. FIG. 5A is a sequence diagram illustrating an example of processing that is executed when the physical server 100 is normal. FIG. 5B is the front half of a sequence diagram illustrating an example of processing that is executed between the physical server 100 and the management server 200 when there is an abnormality in the physical server 100. FIG. 6 is the latter half of the sequence diagram illustrating the example of processing that is executed between the physical server 100 and the management server 200 when an abnormality occurs in the physical server 100.

Processing 500 in FIG. 5A is processing that is executed when the physical server 100 is running normally. The alive notification part 401 regularly transmits a timer reset request signal to the timer 333 based on an interval value which is set in advance or the like, and the timer 333 resets its timer count. The processing 500 is repeated as long as the physical server 100 is running normally.

Processing 501 in FIG. 5B is for the case where an abnormality (or failure) occurs in a component of the physical server 100. The processing in this example is internal processing of the self-monitoring part 330 that is executed when there is a cause of a timeout which poses a problem to processing of the alive notification part 401 running on the management logical server 103.

When there is a cause of a timeout on the timer 333 of the self-monitoring part 330, the alive notification part 401 cannot transmit a timer reset request signal. Examples of the cause of a timeout include the shutting down of the server integration module 101, the shutting down of the OS 402, and the suspension of a service that provides the alive notification part 401. The self-monitoring part 330 is not capable of identifying the cause of the timeout at this point.

FIG. 5B illustrates a case where the alive notification part 401 stops operating due to a timeout or the like. When detecting a timeout from a comparison between its own timer count and a threshold, the timer 333 notifies the abnormality detecting part 331 of the timeout.

The abnormality detecting part 331 receives the timeout notification from the timer 333, and activates the notification part 334 in order to notify an abnormality event, such as a timeout, of the physical server 100 to the outside. The abnormality detecting part 331 also activates the countermeasure part 332 in order to perform recovery of the physical server 100 such as H/W restart.

The abnormality detecting part 331 in this case first requests notification (a notification request 511) from the notification part 334 and, after standby processing based on a time value set in the abnormality detecting part 331 in advance or the like, requests countermeasure (a counter measure request 512) from the countermeasure part 332. This is for preventing the physical server 100 from executing self-recovery such as H/W restart prior to a standby request of the micro recovery part 205 which is described later. In other words, with the notification request (511) transmitted to the notification part 334 earlier, the self-monitoring part 330 prompts the management server 200 to issue a countermeasure command to the countermeasure part 332.

Processing 502 in FIG. 5B indicates the flow of processing between the self-monitoring part 330 of the physical server 100 and the micro recovery part 205 of the management server 200.

With a notification (513) received from the self-monitoring part 330, which is a component of the physical server 100, as a trigger, the notification receiving part 210 transmits a standby request (514) and activates the standby requesting part 214 in order to temporarily withhold self-recovery by the self-monitoring part 330.

The standby requesting part 214 of the micro recovery part 205 transmits to the countermeasure part 332 a standby command (515) for temporarily keeping the self-monitoring part 330 of the physical server 100 from executing self-recovery. An example of the standby command (515) is interruption to the countermeasure part 332, or (in the case where the notification is made as a timeout warning) the resetting of the timer count of the timer 333. The countermeasure part 332 of the self-monitoring part 330 holds off taking an action such as H/W restart of the physical server 100 in this manner.

Processing 503 in FIG. 5B indicates the flow of second processing between the self-monitoring part 330 and the micro recovery part 205.

The notification receiving part 205 of the micro recovery part 205 activates the component string generating part 213 in order to start abnormality site sorting (515). The component string generating part 213 creates a component string which is data for identifying the area of abnormality in the physical server 100, and activates the component string updating part 211 with the component string as an argument. A component string is a string of values that indicates, for each component, whether or not there is an abnormality as shown in FIG. 20 and FIG. 21. FIG. 20 and FIG. 21 show an example in which a bit string is employed as a component string. However, a component string is not limited to a bit string and can be in any format that can store as many values as the count of components, such as an array or a table. The component string generating part 213 generates a component string 810 which reflects the configuration information 220 of the physical server 100 where a timeout has occurred ("start abnormality area sorting operation" in FIG. 5B). The micro recovery part 205 may execute the requesting of the standby request 514 and the starting of the abnormality area sorting 515 in parallel to each other after receiving the notification 513 from the notification part 334.

FIG. 6 illustrates the flow of third processing between the physical server 100 and the management server 200 according to this embodiment. The third processing is executed subsequently to the second processing 503 of FIG. 5B.

Processing 600 indicates the flow of the third processing between the self-monitoring part 330 and the micro recovery part 205. The component string updating part 211 uses the component string generated by the component string generating part 213 to detect at least one site of abnormality, and then identifies an area that is to be recovered. The component string updating part 211 executes abnormality site detecting processing via an interface that can be accessed from the outside, such as the management I/F of the OS 402 of the physical server 100. In this processing, the area of an element where an abnormality (or failure or error) has occurred is identified with an externally accessible component as the start point, out of components constructing the physical server 100.

In FIG. 5B, the site of abnormality is the alive notification part 401. The component string updating part 211 therefore determines that the OS 402 is running normally by coupling a component through the processing 600. In an example of the processing 600, the component string updating part 211 accesses a component that has an external I/F out of the generated component string 810, and determines the running state based on whether there is a response or not. Of the components of the physical server 100 of FIG. 6, one that has an externally accessible interface is the management I/F (for example, API) of the OS 402.

The component string updating part 211 of the micro recovery part 205 sequentially couples to coupling destinations (components) in the component string that are defined in the update operation information 222, and sequentially obtains responses. The component string updating part 211 detects, for each component, the presence or absence of an abnormality from the presence or absence of a response. The update operation information 222 is information in which processing for obtaining a response from components of the physical server 100 is set in advance.

For example, the component string updating part 211 determines that the OS 402 is running normally by coupling to the management I/F of the OS 402 and receiving a coupling response 611. The component string updating part 211 then sets a value that indicates normal running (e.g., 0) to components in the component string 810. That the OS 402 is running normally means that the server integration module 101 and the hardware (BMC 335) in layers above the OS 402 are running normally as well. Accordingly, the component string updating part 211 sets a value that indicates normal running (e.g., 0) to components in the component string 810 that are in layers above (closer to the hardware side than) the OS 402.

As for the running state of the alive notification part 401, which is a component in a layer below the OS 402, on the other hand, the component string updating part 211 makes an inquiry to the external I/F of the OS 402. The OS 402 accesses the alive notification part 401 without receiving a response because the alive notification part 401 has shut down and caused a timeout as illustrated in FIG. 5B. The OS 402 therefore notifies the component string updating part 211 that the running state of the alive notification part 401 is "shut down". The component string updating part 211 sets a value that indicates an abnormality (e.g., 1) to a component in the component string 810 that corresponds to the alive notification part 401. The component string updating part 211 sets values of the component string 810 by sequentially coupling to components of the physical server 100 that are below (or above) a component serving as the start point (the OS 402, in this example). The alive notification part 401 is the lowest component in this example, and the location (area) of abnormality is limited to the alive notification part 401. The micro recovery part 205 identifies the alive notification part 401 as a component where an abnormality has occurred, and then identifies the alive notification part 401 as a recovery target. In the case where "1" is set to a plurality of components in the component string 810, the micro recovery part 205 identifies the component that is in the highest layer of the plurality of components as a recovery target.

Processing 601 indicates the flow of fourth processing between the self-monitoring part 330 and the micro recovery part 205. The micro recovery part 205 refers to the recovery operation information 223 with respect to the recovery target identified, and obtains an operation name to be used in recovery. The micro recovery part 205 issues a command to the recovery part 212 which contains the obtained operation name and the recovery target component.

Based on the command, the recovery part 212 requests (a request 613) the OS 402 to perform recovery on the alive notification part 401 (reactivation of a service or a daemon, or the like). The OS 402 executes the requested reactivation of the alive notification part 401, and sends the result of the recovery operation to the recovery part 212 in response. The recovery part 212 notifies the component string updating part 211 that the recovery operation of the recovery target has been completed, and ends the processing 601.

Processing 602 indicates the flow of fifth processing between the self-monitoring part 330 and the micro recovery part 205. After the recovery operation is executed, the component string updating part 211 requests the standby requesting part 214 to cancel the withholding of self-recovery of the self-monitoring part 330. The standby requesting part 214 cancels the command to temporarily withhold self-recovery which has been issued in the processing 502 of FIG. 5B, and enables the countermeasure (self-recovery) (countermeasure enabling 614). The enabling is accomplished by, for example, interruption to the countermeasure part 332 or the cessation of the transmission of a timer counter reset signal from the standby requesting part 214. The countermeasure part 332 can thus perform recovery in case of abnormality a timeout only on a component where the abnormality has occurred, instead of allowing the physical server 100 to execute self-recovery such as H/W restart. The alive notification part 401 then resets the timer count anew and the self-monitoring part 330 resumes the monitoring of the physical server 100 with the use of a WDT.

Figure 7:
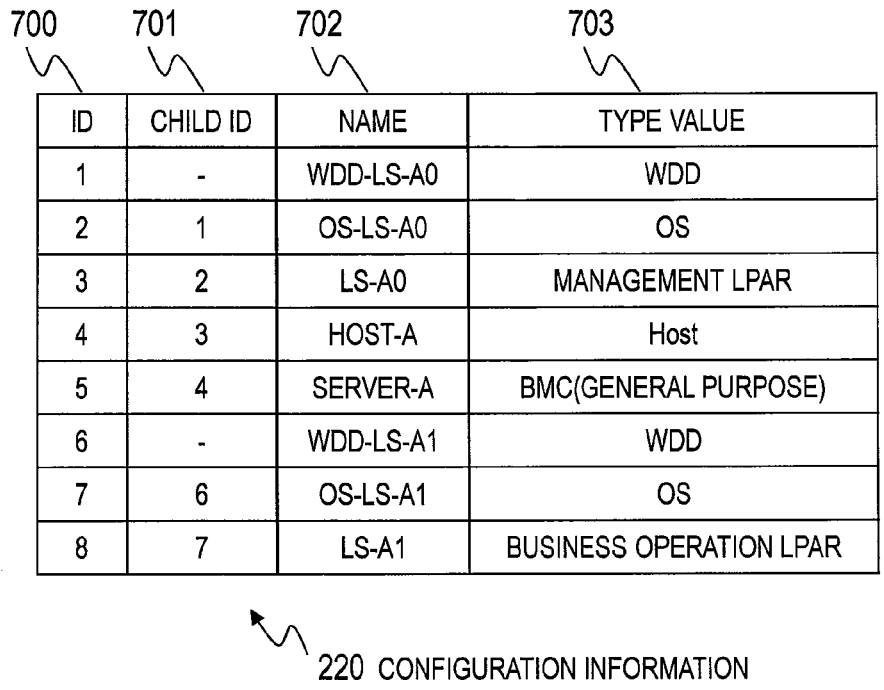
FIG. 7 shows an example of the configuration information according to the first embodiment of this invention.

FIG. 7 shows an example of the configuration information 220. The configuration information 220 is obtained by the configuration management part 208 of the management server 200 from the physical servers 100, the server integration modules 101, the business operation logical servers 102, the management logical servers 103, the intermediate logical server 104, the APs 300 of the business operation logical servers 102, and the APs 400 of the management logical servers 103. The configuration management part 208 obtains information of components from the physical servers 100, the business operation logical servers 102, the management logical servers 103, and others in a given cycle or the like.

A target from which the configuration management part 208 collects information is a management target of the management server 200 and is hereinafter referred to as management target node. In FIG. 7, an ID 700 is an identifier for identifying a management target node on the physical servers 100. A child ID 701 is an identifier for identifying a child management target node of the management target node, and is associated with the ID 700. Whether or not a management target node is a child management target node is determined by the configuration management part 208 based on the communication relation between management target nodes. For instance, the management logical servers 103 ("LS-A0" and "OS-LS-A0" in FIG. 7) which hold communication to and from the control I/F 312 of the server integration module 101 ("HOST-A" in FIG. 7) are child management target nodes of the server integration module 101. Therefore, in an entry that holds "4" as the ID 700 and "HOST-A", a child ID that indicates a management server ("management LPAR" in FIG. 7), "3", is set as the child ID 701.

The business operation logical server 102 ("LS-A1" in FIG. 7) which holds communication to and from the logical BMC 304 is a child management target node of the logical BMC 304 (i.e., a logical partition of the physical server 100=OS-LS-A1). In an entry that holds "8" as the ID 700 and "LS-A1", a child ID that indicates an OS (OS-LS-A1 in FIG. 7) is set as the child ID 701.

In the case where a management target node does not have a child management target node, the value of the child ID 701 is nil. A name 702 is a letter string set as the host name or label of the management target node. A type value 703 is a definition value for identifying the type of the management target node. Set as the type value are "WDD" (Watch Dog Data) which indicates an alive notification part, "OS" of a guest executed as a logical server, "management LPAR" or "business operation LPAR" which indicates a logical server provided by the server integration module 101, "HOST" which indicates the server integration module 101, "BMC" which indicates the physical servers 100, and the like.

The configuration information 220 may be generated for each physical server 100 separately so that pieces of the configuration information 220 are identified by the identifiers of the physical server 100.

Figure 8:
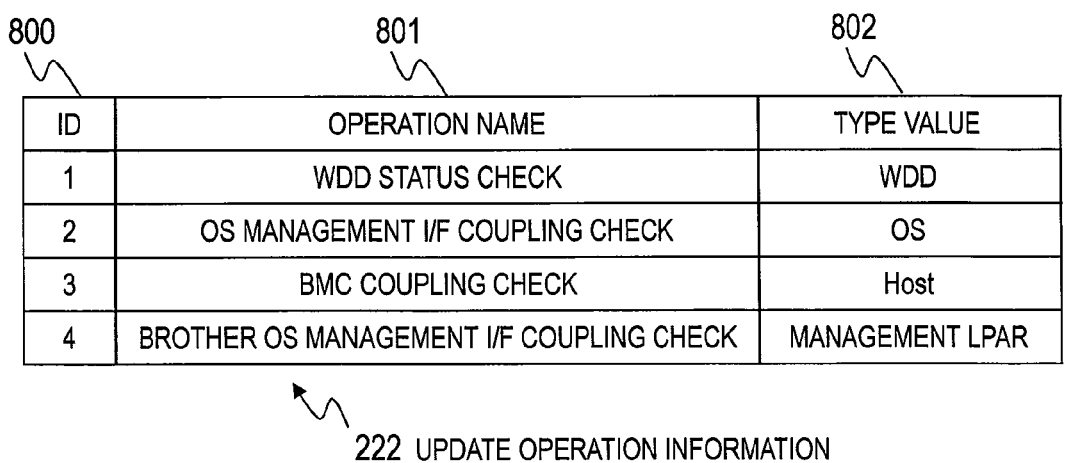
FIG. 8 shows an example of the update operation information according to the first embodiment of this invention.

FIG. 8 shows an example of the update operation information 222. The update operation information 222 indicates operation that is executed by the component string updating part 211 in order to identify a component where an abnormality has occurred. In FIG. 8, an ID 800 is an identifier for identifying a piece of component string update operation information. An operation name 801 is a name for identifying an implement (script, batch file, API, function, or the like) with which component string updating operation is executed and which is prepared in the operation implementation information 225. A type value 803 is a definition value for identifying the type of a management target node. The type value 803 corresponds to the type value 703, and is used to obtain a record of the update operation information 222 from a record of the configuration information 220 through a comparison of the values.

In the shown example, "1" as the ID 800 indicates that the status of the WDD is obtained and determined, "2" as the ID 800 indicates that whether or not coupling to the management I/F of the OS is possible is determined, "3" as the ID 800 indicates that whether or not coupling to the BMC 335 is possible is determined, and "4" as the ID 800 indicates that whether or not coupling to the management I/F of another guest OS on the same physical server 100 is possible is determined.

When the ID 800 is "1", it is determined that the WDT has stopped if the status of the WDD cannot be obtained and, if coupling to the management I/F of the OS is possible, it is further determined that the WDT alone has stopped. In the opposite case where the status of the WDD cannot be obtained and coupling to the management I/F of the OS is not possible, it is determined that the OS has shut down. When it is determined that the OS has shut down and coupling to the management I/F of another guest OS on the same server integration module is possible, it is determined that only the OS of current interest has shut down. When coupling to the BMC is not possible and coupling to the management I/F of the OS is not possible, it is determined that the physical server 100 has shut down.

The area of abnormality can be identified by switching the target of coupling check from the WDT to the BMC and to the management I/F of a brother OS in the manner described above.

FIG. 9 shows an example of the recovery operation information 223. The recovery operation information 223 indicates the operation of recovery from an abnormality (or failure or error). In FIG. 9, an ID 900 is an identifier for identifying the operation of recovering the site of abnormality to a normal state (component recovery operation). An operation name 901 is a name for identifying an implement (script, batch file, API, function, or the like) with which the recovery operation is executed and which is set in the operation implementation information 225. In the shown example, reactivating the WDD (WDT), rebooting the OS, reactivating an LPAR (logical partition), and restarting H/W (the physical server 100) are set as components of the operation of recovery from an abnormality. The operation implementation information 225 (not shown) stores the specifics of operation associated with the operation name 901, or a pointer to the operation.

FIG. 10 shows an example of the standby operation information 224. Set in the standby operation information 224 is information for temporarily keeping the countermeasure part 332 of the self-monitoring part 330 from executing self-recovery processing such as H/W restart when a timeout occurs on the timer 333.

In FIG. 10, a type ID 1000 is a definition value for identifying a management target node on which self-recovery processing is performed, and corresponds to the type value 703 of FIG. 7.

Stored as an operation name 1001 is the name of processing that is executed by the standby requesting part 214 in order to withhold the execution of self-recovery processing. An interval 1002 is a value that indicates an execution interval (in seconds) in periodical execution of processing identified by the operation name 1001.

The standby operation information 224 in the shown example indicates that, when the BMC 335 is a general-purpose BMC, the standby requesting part 214 can keep the countermeasure part 332 from executing H/W restart by transmitting a timer reset signal to the countermeasure part 332 at 60-second intervals. The standby operation information 224 also indicates that, in the case of a BMC capable of preventing H/W restart, the standby requesting part 214 only needs to transmit a withholding signal to the countermeasure part 332 once to prevent H/W restart.

FIG. 20 shows an example of the component string 810 which is generated by the component string generating part 213. The component string generating part 213 generates, from the configuration information 220 of FIG. 7, a bit string that indicates for each component of the physical server 100 that is a management target node the presence or absence of an abnormality (or failure or error). The component string 810, which is built from a bit string 813 in this embodiment, may be in the form of an array or a table.

The component string 810 includes a management target node identifier string 811 which corresponds to the ID 700 of FIG. 7, a name string 812 which corresponds to the type value 703 in FIG. 7, and the bit string 813, which indicates the values of components of a management target node. While the management target node identifier string 811 and the name string 812 which corresponds to the type value 703 are provided in FIG. 20 for easier understanding, the component string 810 may be built from the name (type value: BMC) of the physical server 100 and the bit string 813.

In the bit string 813, the physical layer where the type value is "BMC" is placed as the least significant bit (the right hand side in the drawing) and the application layer where the type value is "WDD" is placed as the most significant bit (the left hand side in the drawing). The component string generating part 213 generates the bit string 813 by generating the bit where the type value is "BMC" from the configuration information 220 of FIG. 7, and then generating bits up to a bit where the type value of the application layer is "WDD" by tracing the child ID 701. The identifier string 811 and the name string 812 which correspond to the bit string 813 are obtained from the configuration information.

In the component string 810 generated by the component string generating part 213, values of the bit string 813 are updated by the component string updating part 211 so as to reflect the presence or absence of an abnormality in the management target node as described later.

An example of processing that is executed in the micro recovery part 205 is described below with reference to flow charts.

Figure 15:
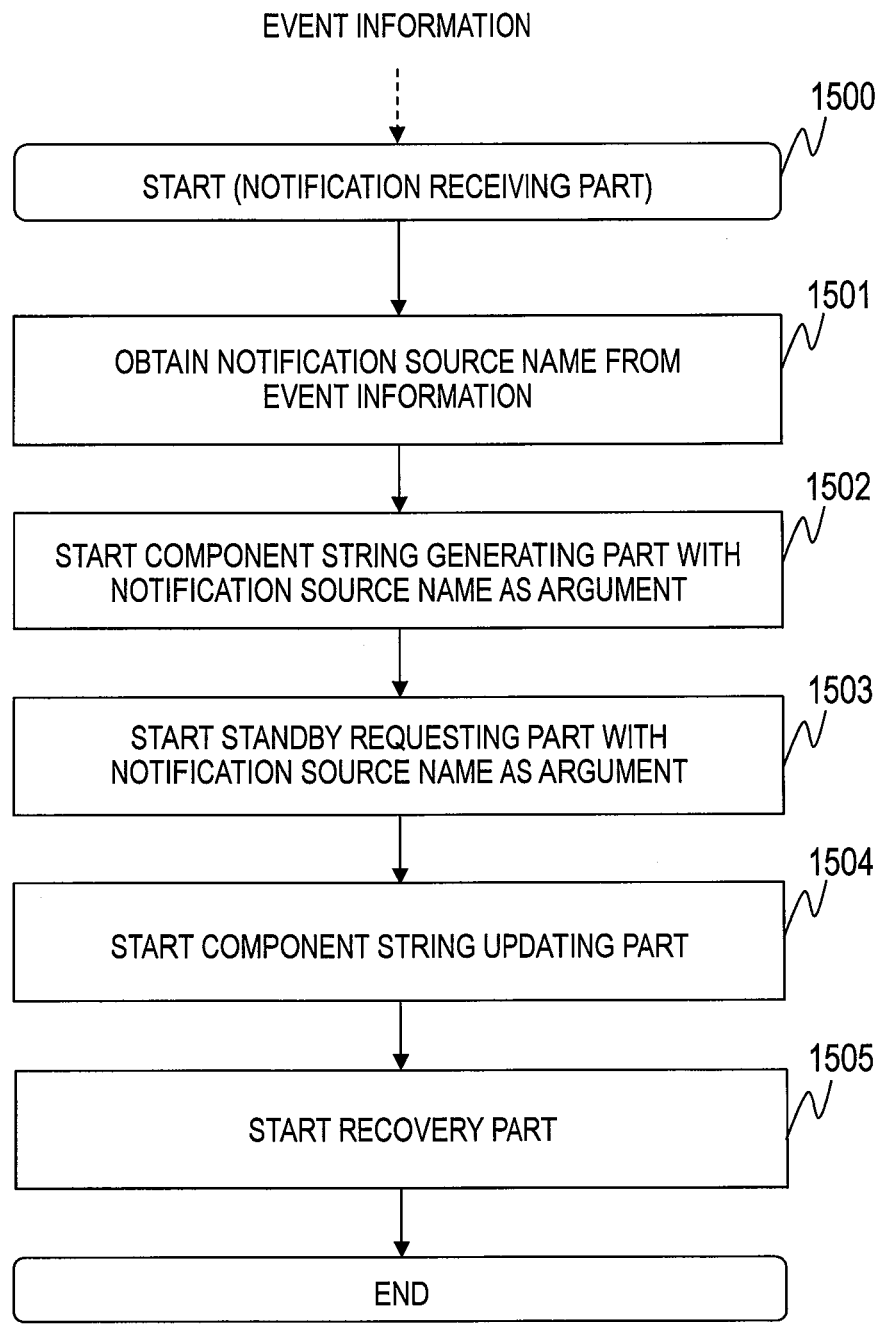
FIG. 15 is a flow chart illustrating an example of processing that is executed in the micro recovery part according to the first embodiment of this invention.

FIG. 15 is a flow chart illustrating an example of processing that is executed in the micro recovery part 205. This processing is started when the notification receiving part 210 of the micro recovery part 205 receives an event (the notification 513).

The notification receiving part 210 is activated with an input of event information (the notification 513) from one of the physical servers 100 as a trigger. For instance, the notification receiving part 210 receives the notification 513 from the notification part 334 of the physical server 100 when a timeout occurs as illustrated in FIG. 5B. The notification 513 transmitted from the notification part 334 of the physical server 100 to the notification receiving part 210 in this case includes the name (or identifier) of the notification source. The notification source name is, for example, "SERVER-A" of FIG. 7 which indicates the physical server 100.

The notification receiving part 210 obtains the notification source name included in the event information (notification 513) (Step 1501). The micro recovery part 205 starts the component string generating part 213 with the notification source name as an argument (Step 1502). The component string generating part 213 extracts a management target node that is identified by the notification source name from the configuration information 220 in a manner described later with reference to FIG. 11, and generates the component string 810 of FIG. 20.

The micro recovery part 205 next starts the standby requesting part 214 with the notification source name as an argument (Step 1503). The standby requesting part 214 sends the standby command 515 for withholding self-recovery processing to the countermeasure part 334 of the physical server 100 that is identified by the notification source name.

The micro recovery part 205 next detects, for each component in the component string 810 generated by the component string generating part 213, the presence or absence of an abnormality and updates the bit string 813 (Step 1504).

The micro recovery part 205 next activates the recovery part 212 to sort out the area of abnormality based on the updated component string 810, and to identify a component (management target node) for which recovery processing is to be executed. The recovery part 212 obtains, from the recovery operation information 233 of FIG. 9, recovery processing that is set to the identified component (management target node). The recovery part 212 notifies the obtained recovery processing (the operation name 901) to the component of the physical server 100 for which the recovery processing is to be executed (Step 1505).

The micro recovery part 205 of the management server 200 according to this embodiment responds to abnormality notification (513) from one of the physical servers 100 by sorting out a component (site) where the abnormality has occurred with the use of the component string 810. The micro recovery part 205 can determine recovery operation appropriate for the site of abnormality from the component string 810 and control the physical server 100 so that the determined recovery processing is performed on the component for which recovery processing is to be executed.

Figure 11:
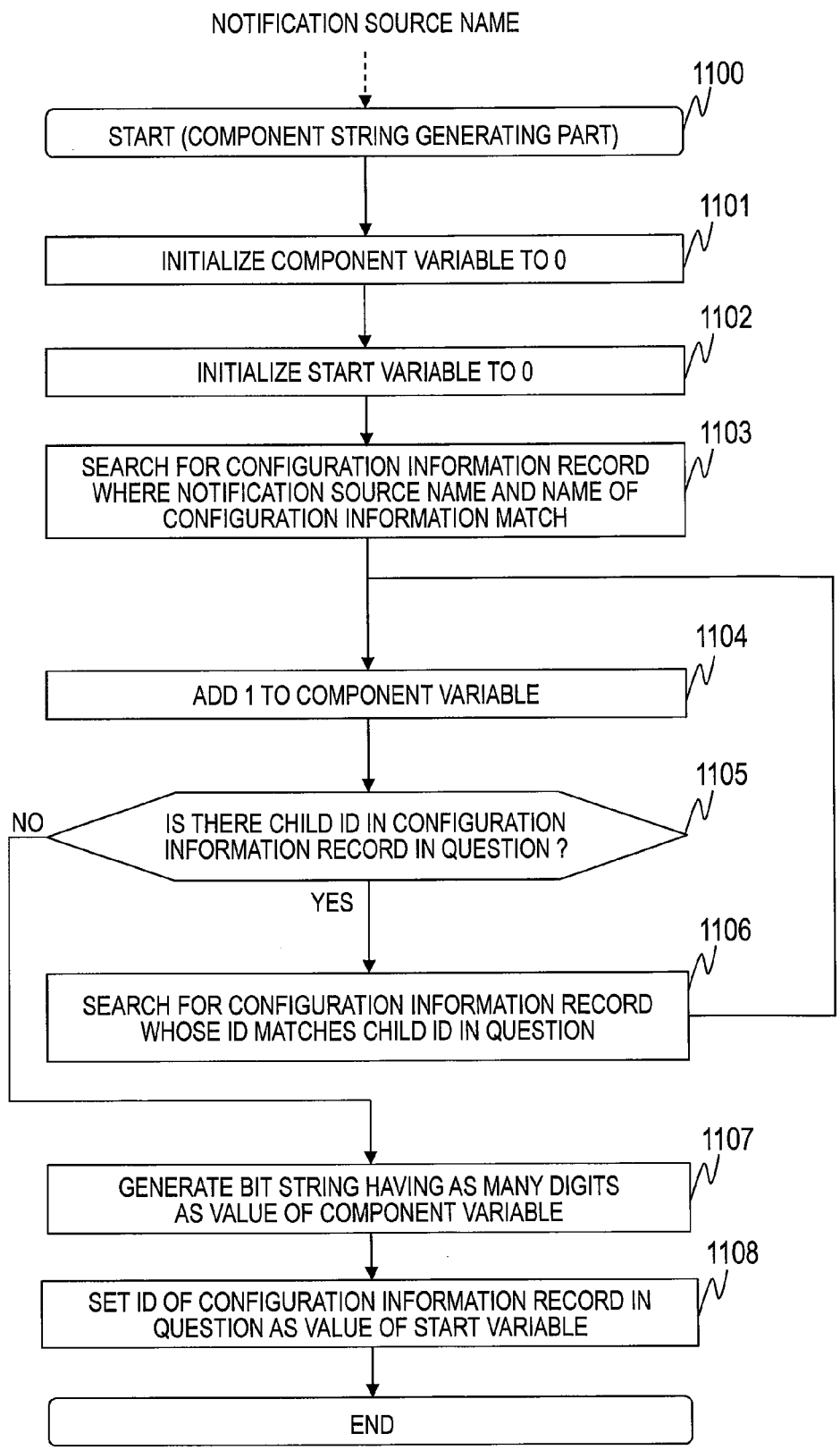
FIG. 11 is a flow chart illustrating an example of processing that is executed by the component string generating part according to the first embodiment of this invention.

FIG. 11 is a flow chart illustrating an example of processing that is executed by the component string generating part 213 according to this embodiment. The component string generating part 213 is activated after the notification receiving part 210 receives a notification source name (for example, "SERVER-A" in FIG. 1B) included in an event that indicates an abnormality in a component of one of the physical servers 100.

The component string generating part 213 initializes a component variable, which is set in advance, to 0 (Step 1101). The component string generating part 213 initializes a start variable, which is set in advance, to 0 (Step 1102).

The component string generating part 213 searches the configuration information 220 for a record where the name 702 matches the received notification source name (Step 1103). The component string generating part 213 adds 1 to the component variable (Step 1104).

The component string generating part 213 determines whether or not an ID is registered as the child ID 701 in the record of current interest of the configuration information 220 (Step 1105). The component string generating part 213 proceeds to Step 1106 in the case where the record has an ID registered as the child ID 701, and proceeds to Step 1107 in the case where the record holds no child ID.

In the case where the record has an ID registered as the child ID 701, the component string generating part 213 searches the configuration information 220 for a record where this child ID 701 matches the ID 700, sets the found record as a new record of interest of the configuration information 220, and returns to Step 1104 to repeat the processing described above (Step 1106). The component string generating part 213 repeats the loop of Steps 1104 to 1106 until every ID registered as the child ID 701 is processed.

In the case where the record has no ID registered as the child ID 701, the component string generating part 213 generates, from the value of the component variable, the component string 810 as information that indicates the site of abnormality (Step 1107). Specifically, the component string generating part 213 generates the bit string 813 which has as many digits as the value of the component variable. As shown in FIG. 20, the component string generating part 213 in this embodiment generates the identifier string 811 for storing the ID 700 and the name string 812 for storing the type value 703 which correspond to the bit string 813.

FIG. 20 shows an example in which an abnormality (timeout) has occurred in one of the physical servers 100. The bit string 813 in this example is made up of 5-digit bits in which a BMC (SERVER-A) that has issued the notification 513 of an abnormality constitutes the least significant bit and the digit count "5" is obtained by adding 1 to the count of the child IDs 701 of "SERVER-A" in the configuration information 220 of FIG. 7. The bit string 813 shows layers of "SERVER-A" sequentially from one where the child ID 701 is "4" to where the application layer "WDD-LS-A0" where the child ID 701 is nil. Each bit in the bit string 813 is set to an initial value, 0.

The component string generating part 213 next extracts the value of the ID 700 from the record of current interest of the configuration information 220 and sets the extracted value as the value of the start variable (Step 1108). In other words, the component string generating part 213 in this embodiment sets the value "1" of the ID 700 in the record where the child ID 701 is nil to the start variable.

The component string 810, which is a bit string having as many digits as the value of the component variable (hereinafter referred to as component bit string) in this embodiment, may instead be a truth value array or a table that has at least one truth value column.

After the component string generating part 213 finishes generating the bit string 813, the standby requesting part 214 is activated in Step 1503 of FIG. 15.

Figure 14:
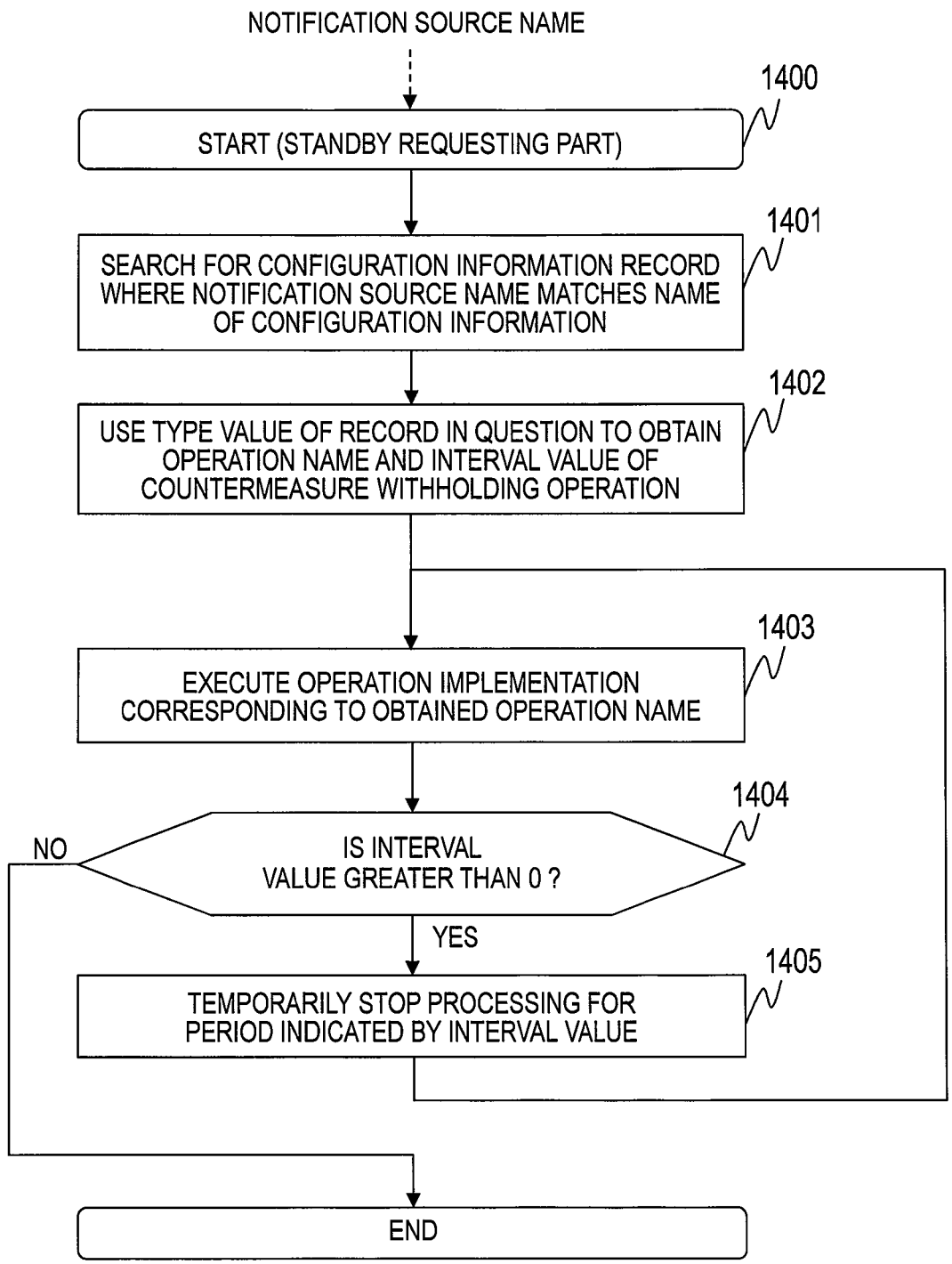
FIG. 14 is a flow chart illustrating an example of processing that is executed by the standby requesting part according to the first embodiment of this invention.

FIG. 14 is a flow chart illustrating an example of processing that is executed by the standby requesting part 214.

The standby requesting part 214 is activated when the notification receiving part 210 receives a notification source name (for example, "SERVER-A" in FIG. 1B) that is included in an abnormality notification (event) input from one of the physical servers 100.

The standby requesting part 214 searches the configuration information 220 for a record where the notification source name matches the name 702 (Step 1401). The standby requesting part 214 obtains the type value 703 from the record of the configuration information 220 whose name 702 matches the notification source name. In this embodiment, where the notification source name is "SERVER-A", the standby requesting part 214 obtains "BMC (general purpose)" as the type value 703.

The standby requesting part 214 searches the standby operation information 224 for a record where the obtained type value 703 matches the type ID 1000, and obtains the operation name 1001 and the interval 1002 from the found record (Step 1402). In this embodiment where the type value 703 is "BMC (general purpose)", the standby requesting part 214 obtains "timer reset signal transmission" as the operation name 1001 and "60 (msec.)" as the interval 1002.

The standby requesting part 214 executes the operation implementation information 225 that corresponds to the obtained operation name 1001 (Step 1403). The standby requesting part 214 in this embodiment obtains a command or script for transmitting a timer reset signal from the operation implementation information 225, and executes the resetting of the timer 333.

The standby requesting part 214 determines whether or not the interval 1002 obtained in Step 1402 is larger than 0. The standby requesting part 214 proceeds to Step 1405 when the interval 1002 is larger than 0, and ends the processing when the interval 1002 is equal to or smaller than 0 (Step 1404).

The standby requesting part 214 temporarily suspends the start of self-recovery processing (H/W restart (reboot)) by the self-monitoring part 330 for a period indicated by the value of the interval 1002, and then returns to Step 1403 to repeat the processing described above (Step 1405).

Through the processing described above, the BMC 335 which has issued an abnormality notification is controlled so as to reset the timer 333 of the self-monitoring part 330, and prevent a timeout from starting self-recovery processing (H/W restart). When the interval 1002 is 0, the BMC 335 only needs to instruct the self-monitoring part 330 to withhold H/W restart once. The withholding of H/W restart may be accomplished by setting the value of the interval 1002 to a timer (not shown) of the management server 200 and repeatedly resetting the timer 333 through timer interruption, instead of executing the loop of Steps 1404 and 1405. In other words, processing of FIG. 12 and processing of FIG. 13 may be executed during a period in which self-recovery processing by the self-monitoring part 330 of the BMC 335 is withheld.

Figure 12:
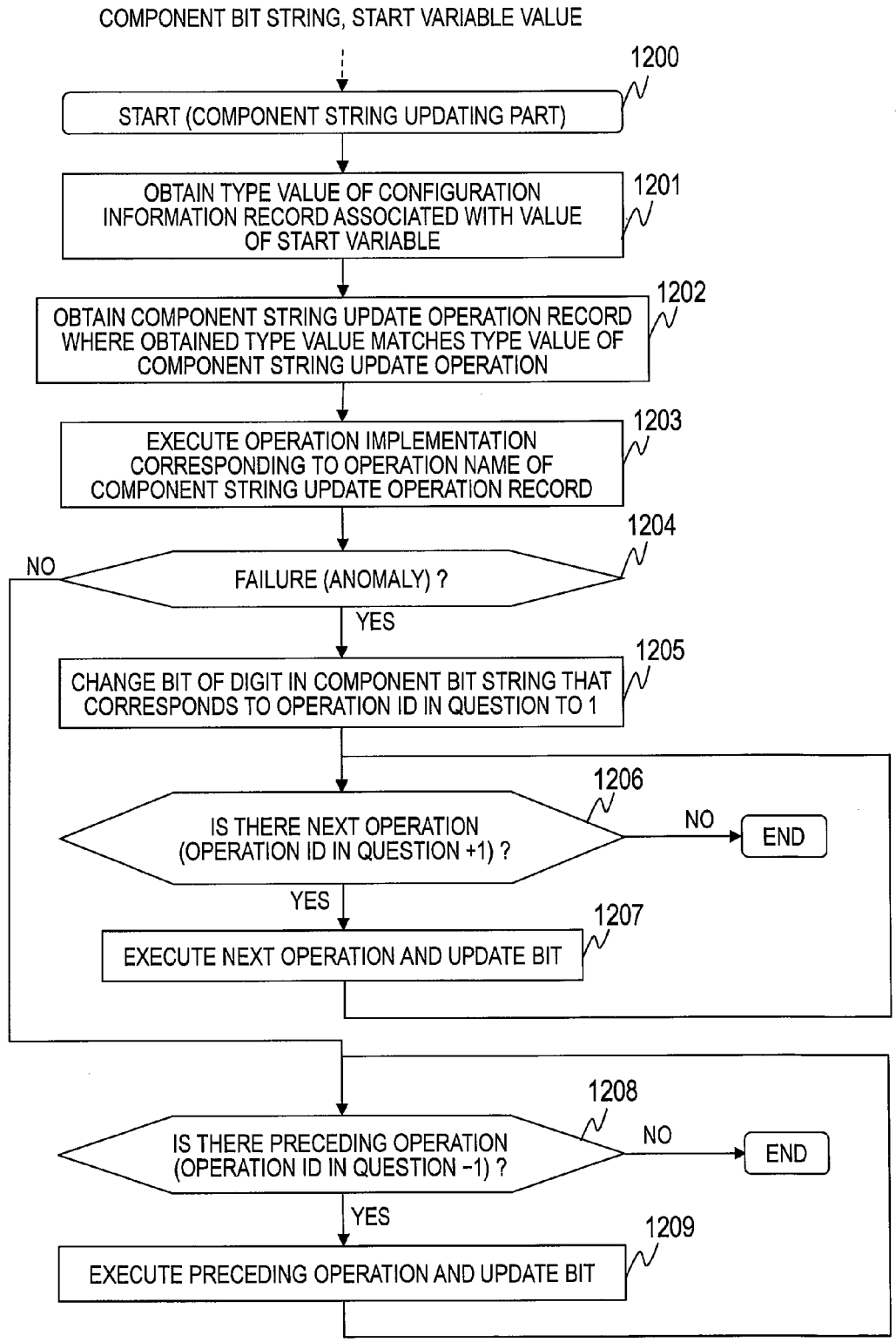
FIG. 12 is a flow chart illustrating an example of processing that is executed by the component string updating part according to the first embodiment of this invention.

FIG. 12 is a flow chart illustrating an example of processing that is executed by the component string updating part 211 according to this embodiment. The component string updating part 211 is activated by the micro recovery part 205 with the component string 810, which has been generated in Step S 1107 and which includes the bit string 813, and the value of the start variable, which has been set in Step 1108 (ID=1), as an input.

The component string updating part 211 obtains the type value 703 from a record of the configuration information 220 that corresponds to the value of the start variable (Step 1201). In this embodiment where the value "1" of the ID 700 in a record of the configuration information 220 of FIG. 7 for "SERVER-A" is set to the start variable, "WDD" is obtained as the type value 703.

The component string updating part 211 searches the update operation information 222 for a record where a type value 802 matches the type value 703 of the record of the configuration information 220, and extracts the operation name 801 (Step 1202). In this embodiment where "1" is set to the start variable, "WDD status check" in a record of FIG. 8 that has "1" as the ID 800 is set as the operation name 801 of processing for updating the component string 810.

The component string updating part 211 executes the operation implementation information 225 that corresponds to the operation name 801 of the component string update operation information 222 (Step 1203). The component string updating part 211 proceeds to Step 1205 when the execution of Step 1203 is a success, and proceeds to Step 1208 when the execution fails (Step 1204). For example, in the case where the operation name 801 is "WDD status check", the execution is determined as a success when the value of the timer 333 can be obtained and is determined as a failure when the value of the timer 333 cannot be obtained.

In the case where the operation of the operation name 801 fails, the component string updating part 211 sets the value of the bit string 813 in a digit that corresponds to the ID 800 in question to "1" (Step 1205). The component string updating part 211 determines whether or not there is next (the value of the ID 800 in question +1) operation. The component string updating part 211 proceeds to Step 1207 when there is the next operation, and ends the processing when there is no next operation (Step 1206).

The component string updating part 211 executes the next operation as in Step 1203, updates the component bit string, and proceeds to Step 1206 (Step 1207). The component string updating part 211 checks whether or not there is preceding (the value of the ID 800 in question −1) operation. The component string updating part 211 proceeds to Step 1209 when there is preceding operation, and ends the processing when there is no preceding operation (Step 1208). The component string updating part 211 executes the preceding operation as in step 1203, updates the component bit string, and proceeds to Step 1312 (Step 1209).

Through the processing described above, a bit in the bit string 813 for which the operation having the operation name 801 has failed is set to "1". For example, in the case where the alive notification part 401 shuts down as in FIG. 5B, only "WDD status check" fails and operation in entries of FIG. 8 where the ID 800 is "2" or larger succeeds. The bit string 813 in this case is as shown in FIG. 21, where only the most significant bit which has a type value "WDD" is "1", and a component in which the abnormality has occurred is identified in this manner. In the case where an abnormality has occurred in a plurality of components, in particular, the minimum area of components for which recovery is to be executed can be identified. For example, in the case where an abnormality has occurred in the alive notification part 401 and an abnormality has occurred in the OS 402 of the management logical server 103 as well, reactivating components that are on the application side with respect to the OS 402 is sufficient and there is no need to operate the server integration module 101 and components under the server integration module 101.

While the start variable is referred to in the example given above, operation corresponding to the operation name 801 may be executed sequentially, starting from a record of the update operation information 222 where the ID 800 is "1". In this case, a corresponding operation name 801 is associated with the type value 703 of the configuration information 220 in advance. Alternatively, the type value 703 of the configuration information 220 may be associated with the operation name 801.

Figure 13:
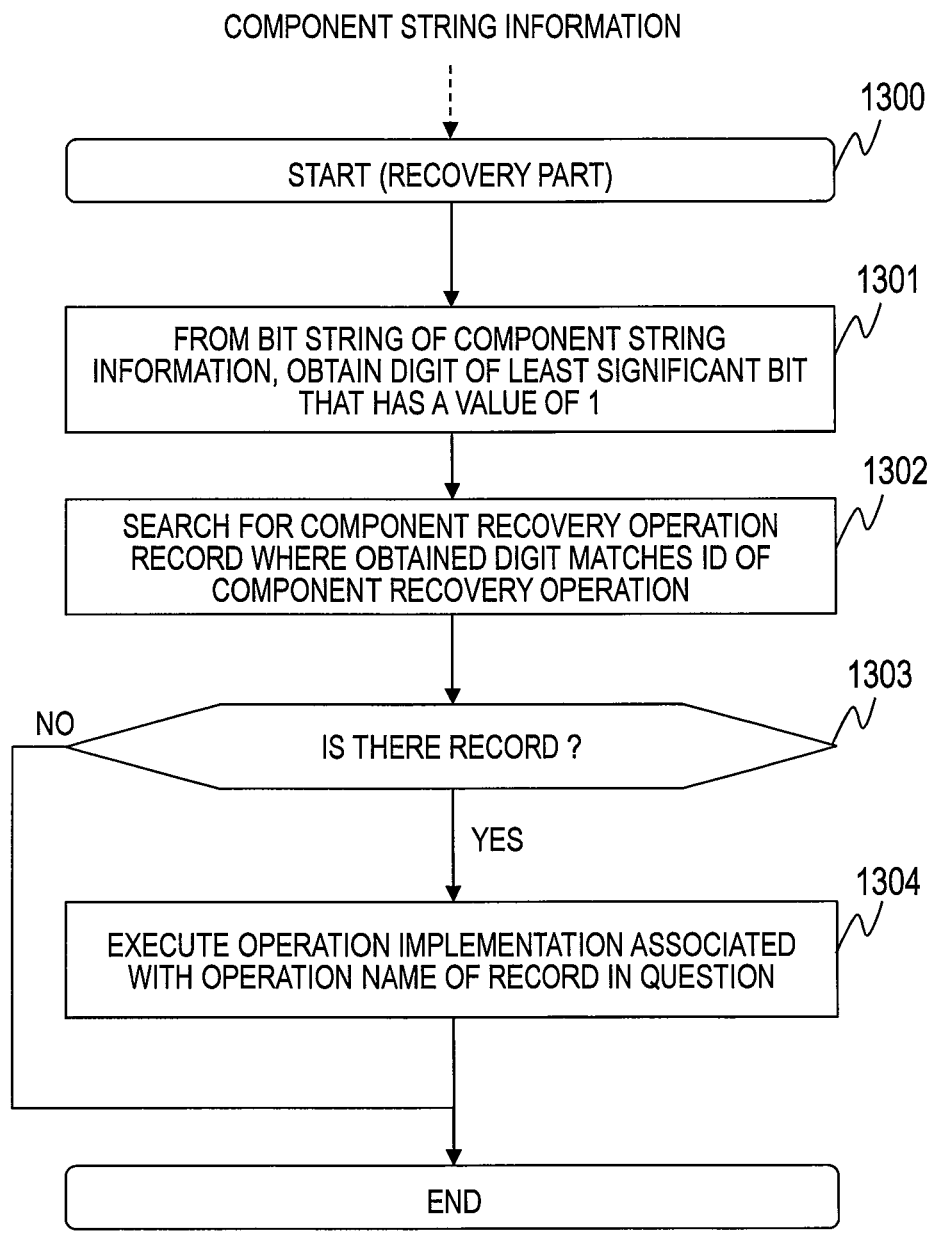
FIG. 13 is a flow chart illustrating an example of processing that is executed by the recovery part according to the first embodiment of this invention.

FIG. 13 is a flow chart illustrating an example of processing that is executed by the recovery part 212. The recovery part 212 is activated by the component string updating part 211 of the micro recovery part 205 with the component string 810 as an input. The recovery part 212 obtains, from the bit string 813 of the component string 810, the digit of the least significant bit that has a value "1" (true) (Step 1301).

The recovery part 212 searches the recovery operation information 223 for a record where the obtained digit matches the ID 900 to extract an operation name from the record (Step 1302). The recovery part 212 proceeds to Step 1304 when such a record is found in the recovery operation information 233, and ends the processing when the recovery operation information 233 does not have the record (Step 1303). The recovery part 212 executes the operation implementation information 225 that corresponds to the operation name 901 extracted from the found record of the recovery operation information 223 (Step 1304). In this step, when the operation name 901 is "H/W restart", the standby requesting part 214 cancels the standby command 515 issued to the countermeasure part 332, thereby allowing the countermeasure part 332 to execute H/W restart. In the case where the operation name 901 is not "H/W restart", on the other hand, the standby requesting part 214 transmits to the countermeasure part 332 an instruction to enable the countermeasure (countermeasure enabling 614) to enable H/W restart.

Through the processing described above, the recovery part 212 obtains the operation name 901 from the recovery operation information 233 for the least significant bit in the bit string 813 of the component string 810, and executes recovery operation set to the operation name 901 for a component where an abnormality has occurred. In the case of the component string 810 of FIG. 21, for example, an abnormality has occurred in "WDD" and the recovery part 212 therefore instructs the management I/F of the OS 402 to execute "WDD restart" and requests the reactivation of the alive notification part 401 (613) as illustrated in FIG. 6.

As has been described, according to this embodiment, a virtual computer system which detects an abnormality with the use of a WDT identifies, for each component of the affected physical server 100, the cause of a timeout on the WDT, and can identify a target of recovery from the abnormality. The area of components of the computer system for which recovery operation is performed is thus minimized.

Second Embodiment

The first embodiment describes a method in which the micro recovery part 205 responds to abnormality notification from one of the physical servers 100 by sorting out a component in which the abnormality has occurred and determining and executing recovery operation to be performed on the component (site) where the abnormality has occurred. A second embodiment of this invention describes a case in which the management server 200 does not manage partial components such as the AP 300 for reasons such as securing scalability and lessening the load.

FIG. 16 shows an example of information that is included in the configuration information 220 in the case where the management server 200 does not manage partial components such as the AP 300. A comparison to FIG. 7, which illustrates the first embodiment, shows that FIG. 16 does not include information about the AP 300 (the type value 703=WDD). This is for reducing the data amount of the configuration information 220 kept on the management server 200 and for reducing the amount of configuration information collected from the respective management nodes. The granularity of components managed in the configuration information 220 in this case differs from the component granularity of the update operation information 222 or the recovery operation information 223.

The second embodiment differs from the first embodiment in that component characteristics information 221 is used and in the specifics of the type value 703 stored in the configuration information 220 as described below. The rest of the configuration of the second embodiment is the same as that of the first embodiment.

FIG. 17 shows an example of the component characteristics information 221. In FIG. 17, a type ID 1700 is a definition value for identifying the type of a management target node, and corresponds to the type value 703 of the configuration information 220 of FIG. 16. Offset 1701 indicates, for each management target node, the necessary component count of non-management target necessary components included in the management target node.

A non-management target necessary component is an apparatus or software inside a management target node which is not treated as a management target node but is treated as a control target by the component string updating part 211 and the recovery part 212. An example of the non-management target necessary component is the alive notification part 401. The alive notification part 401 is a service (or daemon) of the OS 402, and is not treated as a management target node in management of the physical servers 100 in some cases, but is accessed by the component string updating part 211 or the recovery part 212. The non-management target necessary component in this case is treated as one component of the OS, and "1" is set as the value of the offset 1701 of the OS (402) in the component characteristics information.

Start point permission 1702 is a truth value that indicates whether or not the component in question can be selected as a start point in the processing 600 for detecting the site of abnormality, which is illustrated in FIG. 6. This value is determined in advance, depending on whether or not the component that is identified by the type ID 1700 has an I/F open to the outside. In the case of FIG. 3, for example, the OS 302 (402) has a management I/F open to the outside, whereas the control I/F 312 of the server integration module 101 can be accessed only via the management I/F of the OS 302 (402). The value of the start point permission 1702 in this case is "Y" for the OS 302 (402), and "N" for the server integration module 101.

Figure 18:
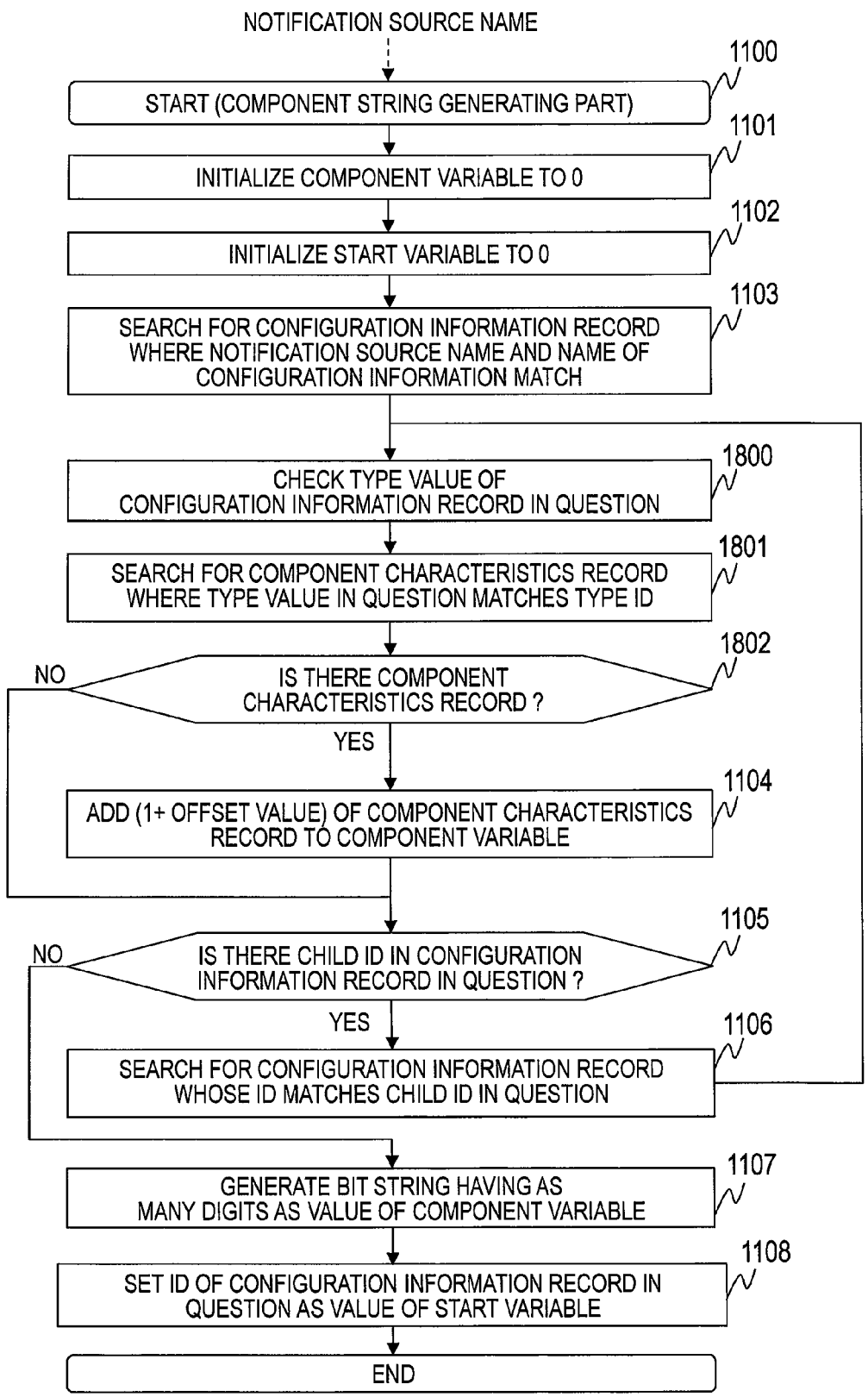
FIG. 18 is a flow chart illustrating an example of processing that is executed by the component string generating part according to the second embodiment.

FIG. 18 is a flow chart illustrating an example of processing that is executed by the component string generating part 213 according to the second embodiment. FIG. 18 differs from FIG. 11, which illustrates the first embodiment, in that Steps 1800, 1801, and 1802 are added, and in that Steps 1104 and 1106 are changed. Descriptions on portions of the processing that are the same as those in the first embodiment are omitted.

The component string generating part 213 searches the configuration information 220 for a record where the received notification source name matches the name 702 as in the first embodiment (Step 1103). The component string generating part 213 obtains the record of the configuration information 220 where the notification source name matches the name 702.

The component string generating part 213 checks the type value 703 of the obtained record of the configuration information 220 (Step 1800). The component string generating part 213 searches the component characteristics information 221 for a record where the checked type value 703 matches the type ID 1700 (Step 1801).

When the component characteristics information 221 has a record where the type value 703 matches the type ID 1700, the component string generating part 213 obtains this record and proceeds to Step 1104. When there is no such record, the component string generating part 213 proceeds to Step 1105 (Step 1802).

The component string generating part 213 adds 1 to the value of the offset 1701 in the record obtained from the component characteristics information 221, and adds the resultant value to the component variable (Step 1104).

Next, the component string generating part 213 determines whether or not an ID is registered as the child ID 701 in the record of current interest of the configuration information 220 (Step 1105). The component string generating part 213 proceeds to Step 1106 in the case where the record has an ID registered as the child ID 701, and proceeds to Step 1107 in the case where the record holds no child ID.

In the case where the record has an ID registered as the child ID 701, the component string generating part 213 searches the configuration information 220 for a record where this child ID 701 matches the ID 700, sets the found record as a new record of interest of the configuration information 220, and returns to Step 1800 to repeat the processing described above (Step 1106). The component string generating part 213 repeats the loop of Steps 1104 to 1106 until every ID registered as the child ID 701 is processed.

Subsequently, as in the first embodiment, in the case where the record has no ID registered as the child ID 701, the component string generating part 213 generates, from the value of the component variable, the component string 810 as information that indicates the site of abnormality (Step 1107). Specifically, the component string generating part 213 generates the bit string 813 which has as many digits as the value of the component variable.

The component string generating part 213 then sets the value of the ID 700 in the record of current interest of the configuration information 220 as the value of the start variable (Step 1108).

Through the processing described above, the component string generating part 213 of the second embodiment generates the component string 810 by adding the value of the offset 1701 of the component characteristics information 221.

Figure 19:
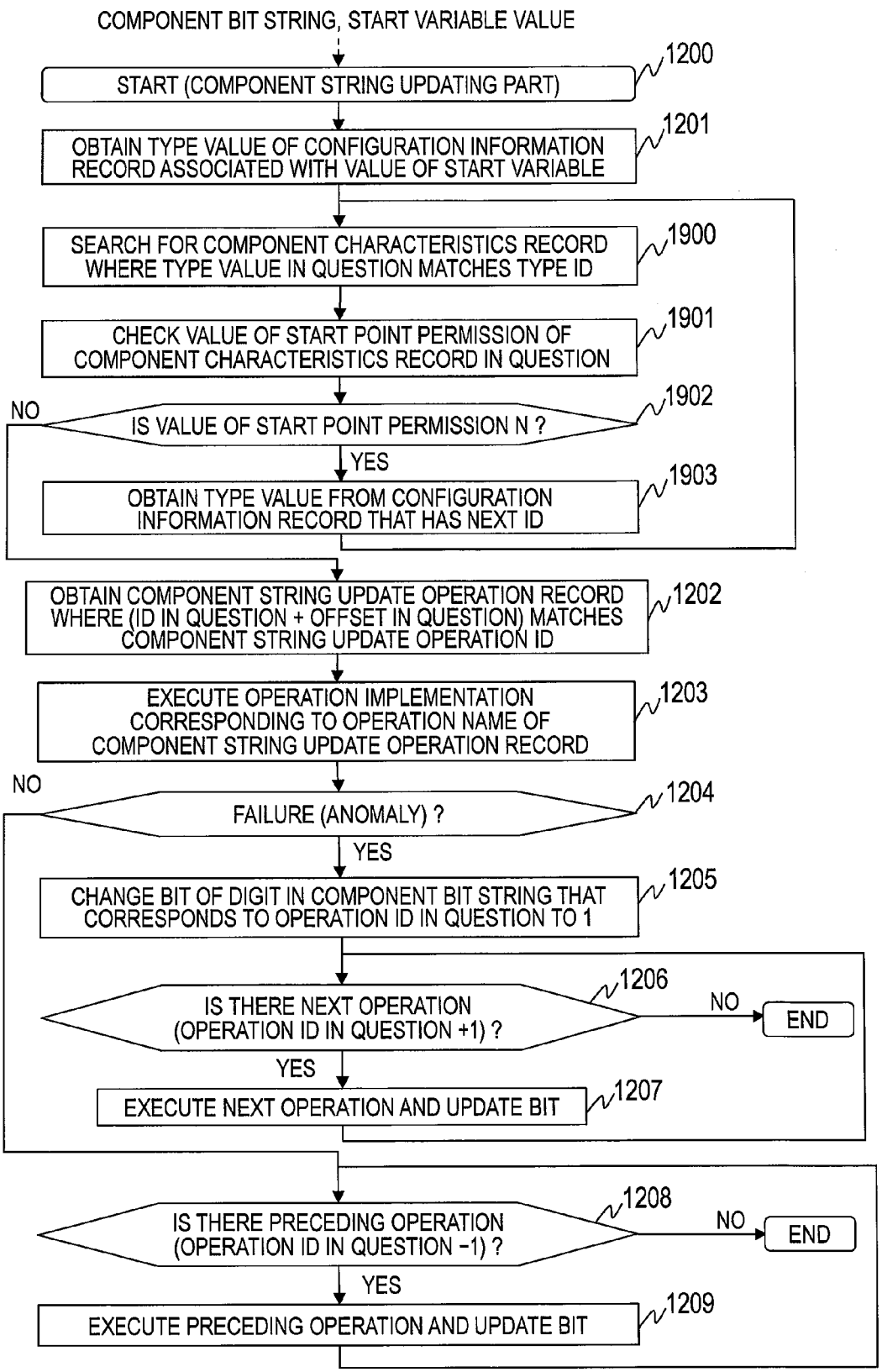
FIG. 19 is a flow chart illustrating an example of processing that is executed by the component string updating part according to the second embodiment.

FIG. 19 is a flow chart illustrating an example of processing that is executed by the component string updating part 211 according to the second embodiment.

FIG. 19 differs from the flow chart of FIG. 12, which illustrates processing of the component string updating part 211 of the first embodiment, in that the Steps 1900, 1901, 1902, and 1903 are added. The rest is the same as in the first embodiment.

The component string updating part 211 searches the component characteristics information 221 for a record where the type ID 1700 matches the type value 703 of a record of the configuration information 220 that corresponds to the value of the start variable (Step 1900).

The component string updating part 211 determines whether or not the value of the start point permission 1702 is "N" in the found record of the component characteristics information 221 (Step 1901). The component string updating part 211 proceeds to Step 1202 when the value of the start point permission 1702 is "Y (true)", and proceeds to Step 1903 when the value of the start point permission 1702 is "N (false)" (Step 1902).

When the value of the start point permission 1702 is "N", the component string updating part 211 obtains the type value 703 from a record of the configuration information 220 that has the next ID 700, and returns to Step 1900 to repeat the processing described above (Step 1903).

When the value of the start point permission 1702 is "Y", on the other hand, the component string updating part 211 proceeds to Step 1202 to detect, for each bit in the bit string 813, the presence or absence of an abnormality as in the first embodiment.

As has been described, according to the second embodiment, where some of components are not managed in the configuration information 220, an abnormality in a component that is not managed and an area where recovery operation is to be executed can be identified when abnormality notification is received from one of the physical servers 100.

What is claimed is:

1. A computer recovery method for a computer system, the computer system comprising:
a management computer comprising a processor and a memory; and
a computer comprising a processor, a memory, and a monitoring part for notifying, when an abnormality occurs, the management computer of the abnormality, the management computer being configured to instruct recovery from the abnormality,
the computer recovery method comprising:
obtaining, by the management computer, hardware components and software components of the computer as configuration information, which indicates a communication relationship between the hardware components and software components, and includes an identifier and a type value indicating a type of each of the hardware components and software components;
receiving, by the management computer, notification of an abnormality from the monitoring part of the computer including an identifier of one of the hardware components and software component; and
generating, by the management computer, in response to the notification of the abnormality, component string information for identifying a component where the abnormality has occurred from the configuration information based on the identifier in the notification of the abnormality, the component string information is data identifying one or more of the hardware components and software components having the abnormality in the computer;
referring to a type value that corresponds to a hardware component or a software component in the configuration information and obtaining a process, which is predetermined and corresponds to the type value for each hardware component and software component, executing the obtained process and obtaining, by the management computer, a response to the obtained process;

updating, by the management computer, the component string information based on the response obtained for the hardware component or the software component; and setting a given value to a component in the component string information when an abnormality is indicated in the response.

2. The computer recovery method according to claim 1, further comprising:
a sixth step of identifying, by the management computer, from the component string information, a component for which recovery is to be executed out of at least one component where the abnormality has occurred and to which the given value is set; and
a seventh step of obtaining, by the management computer, recovery processing that is associated with the identified component from recovery operation information set in advance, and instructing the computer to execute the obtained recovery processing.

3. The computer recovery method according to claim 1, wherein the monitoring part of the computer comprises a recovery processing part for executing hardware reset after the abnormality notification, and
wherein the second step comprises transmitting, by the management computer, when the abnormality notification is received, a request to withhold hardware reset to the recovery processing part.

4. The computer recovery method according to claim 1, wherein the management computer comprises component characteristics information in which components that are excluded from the configuration information are set in advance, and
wherein the third step comprises generating, by the management computer, after the notification is received, component string information for identifying a component where the abnormality has occurred from the component characteristics information in addition to the configuration information.

5. The computer recovery method according to claim 1, wherein the computer further comprises a virtualization module for executing a virtual machine, and the virtual machine comprises an alive notification part for resetting a timer of the monitoring part in given cycles.

6. A computer system, comprising:
a management computer comprising a processor and a memory; and
a computer comprising a processor, a memory, and a monitoring part for notifying, when an abnormality occurs, the management computer of the abnormality,
wherein the memory of the management computer stores configuration information in which hardware components and software components obtained from the computer are stored, and which indicates a communication relationship between the hardware components and software components, and includes an identifier and a type value indicating a type of each of the hardware components and software components, and
wherein the memory further stores instructions that when executed by the processor cause the processor to:

receive notification of an abnormality from the monitoring part of the computer including an identifier of one of the hardware components and software component; and generate, in response to the notification of the abnormality, component string information for identifying a component where the abnormality has occurred from the configuration information based on the identifier in the notification of the abnormality, the component string information is data identifying one or more of the hardware components and software components having the abnormality in the computer;

refer to a type value that corresponds to a hardware component or a software component in the configuration information and obtaining a process, which is predetermined and corresponds to the type value for each hardware component and software component, execute the obtained process and obtain a response to the obtained process;

update the component string information based on the response obtained for the hardware component or the software component; and set a given value to a component in the component string information when an abnormality is indicated in the response.

7. The computer system according to claim 6,
wherein the management computer further comprises:
recovery operation information in which recovery processing that is associated with the component is set in advance; and
a recovery part for identifying, from the component string information, a component for which recovery is to be executed out of at least one component where the abnormality has occurred and to which the given value is set, and
wherein the recovery part obtains recovery processing that is associated with the identified component from the recovery operation information set in advance, and instructs the computer to execute the obtained recovery processing.

8. The computer system according to claim 6,
wherein the monitoring part of the computer comprises a recovery processing part for executing hardware reset after the abnormality notification, and
wherein the management computer transmits, when the abnormality notification is received, a request to withhold hardware reset to the recovery processing part.

9. The computer system according to claim 6,
wherein the management computer further comprises component characteristics information in which components that are excluded from the configuration information are set in advance, and
wherein the component string generating part generates, after the notification is received, component string information for identifying a component where the abnormality has occurred from the component characteristics information in addition to the configuration information.

10. The computer system according to claim 6, wherein the computer further comprises a virtualization module for executing a virtual machine, and the virtual machine comprises an alive notification part for resetting a timer of the monitoring part in given cycles.

11. A non-transitory computer-readable storage medium having stored thereon a program for controlling a management computer comprising a processor and a memory, the program controlling the management computer to execute instructions comprising:

obtaining hardware components and software components of a computer coupled to the management computer as configuration information, which indicates a communication relationship between the hardware components and software components, and includes an identifier and a type value indicating a type of each of the hardware components and software components;

receiving notification of an abnormality from the computer including an identifier of one of the hardware components and software component; and generating, in response to the notification of the abnormality, component string information for identifying a component where the abnormality has occurred from the configuration information based on the identifier in the notification of the abnormality, the component string information is data identifying one or more of the hardware components and software components having the abnormality in the computer;

referring to a type value that corresponds to a hardware component or a software component in the configuration information and obtaining a process, which is predetermined and corresponds to the type value for each hardware component and software component, executing the obtained process and obtaining, by the management computer, a response to the obtained process;

updating, by the management computer, the component string information based on the response obtained for the hardware component or the software component; and setting a given value to a component in the component string information when an abnormality is indicated in the response.

12. The non-transitory computer-readable storage medium according to claim 11, wherein the program further controls the management computer to execute instructions comprising:

identifying, from the component string information, a component for which recovery is to be executed out of at least one component where the abnormality has occurred and to which the given value is set; and obtaining recovery processing that is associated with the identified component from recovery operation information set in advance, and instructing the computer to execute the obtained recovery processing.

* * * * *